United States Patent
Tsukada et al.

(10) Patent No.: US 8,161,736 B2
(45) Date of Patent: Apr. 24, 2012

(54) EXHAUST GAS CLEANING SYSTEM FOR ENGINEERING VEHICLE

(75) Inventors: Hidenobu Tsukada, Ushiku (JP);
Kazunori Nakamura, Tsuchiura (JP);
Shohei Kamiya, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 322 days.

(21) Appl. No.: 12/663,127

(22) PCT Filed: Oct. 22, 2008

(86) PCT No.: PCT/JP2008/069147
§ 371 (c)(1),
(2), (4) Date: Dec. 4, 2009

(87) PCT Pub. No.: WO2009/060719
PCT Pub. Date: May 14, 2009

(65) Prior Publication Data
US 2010/0170227 A1    Jul. 8, 2010

(30) Foreign Application Priority Data

Nov. 6, 2007   (JP) ................................ 2007-288898

(51) Int. Cl.
*F01N 3/00* (2006.01)
(52) U.S. Cl. ................ 60/295; 60/286; 60/297; 60/303; 60/311
(58) Field of Classification Search ............ 60/280, 60/286, 295, 297, 299, 303, 311
See application file for complete search history.

(56) References Cited

U.S. PATENT DOCUMENTS

| | | | | |
|---|---|---|---|---|
| 5,388,400 | A * | 2/1995 | Hoppenstedt et al. | 60/274 |
| 6,584,768 | B1 * | 7/2003 | Hecker et al. | 60/297 |
| 7,523,606 | B2 * | 4/2009 | Strauser et al. | 60/300 |
| 7,743,604 | B1 * | 6/2010 | Albanesi | 60/287 |
| 7,762,060 | B2 * | 7/2010 | Easley et al. | 60/285 |
| 7,813,869 | B2 * | 10/2010 | Grichnik et al. | 701/114 |

FOREIGN PATENT DOCUMENTS

| | | |
|---|---|---|
| JP | 2004-143987 A | 5/2004 |
| JP | 2004-150417 A | 5/2004 |
| JP | 2005-120895 A | 5/2005 |
| JP | 2005-139944 A | 6/2005 |
| JP | 2005-337062 A | 12/2005 |
| JP | 2006-37925 A | 2/2006 |
| JP | 2006-283656 A | 10/2006 |

\* cited by examiner

*Primary Examiner* — Binh Q Tran
(74) *Attorney, Agent, or Firm* — Mattingly & Malur, PC

(57) ABSTRACT

An exhaust gas cleaning system for an engineering vehicle, such as a hydraulic excavator, is capable of performing manual regeneration control of a regeneration fuel injector 40 that is started only under the following conditions: a manual regeneration starting switch 39 is enabled; an engine control dial 2 commands a low-speed idle revolution speed; and a gate lock lever 22 is switched to a second position B at which generation of control pilot pressures a through f by use of remote control valves 25, 26, and 27 is disabled. Even when the manual regeneration control is being executed, if the gate lock lever 22 is switched to a first position A, the manual regeneration control immediately ends. As a result, the manual regeneration control of a filter for collecting particulate matter included in the exhaust gas and the operation of the work system do not influence each other.

5 Claims, 14 Drawing Sheets

EXHAUST GAS CLEANING SYSTEM FOR ENGINEERING VEHICLE

TECHNICAL FIELD

The present invention relates to exhaust gas cleaning systems for engineering vehicles. The invention more particularly relates to an exhaust gas cleaning system for an engineering vehicle, the exhaust gas cleaning system being capable of carrying out manual regeneration control to burn off and remove particulate matter deposited in a filter for collecting particulate matter included in an exhaust gas in a travelling engineering vehicle, such as a hydraulic excavator, so that the filter is regenerated.

BACKGROUND ART

Exhaust gas cleaning systems disclosed in patent documents 1, 2 are known as a system for collecting particulate matter (hereinafter referred to as "PM") included in an exhaust gas of a diesel engine to reduce the quantity of PM exhausted to the outside. This system includes a filter that is called a particulate filter (DPF: Diesel Particulate Filter). The filter is disposed in an exhaust system of an engine. This filter collects PM included in an exhaust gas so as to clean up the exhaust gas. In addition, the systems disclosed in the patent documents 1, 2 are configured to perform such control (manual regeneration control) that in order to prevent a filter from being clogged, start of the regeneration control is instructed by manual operation, and the temperature of an exhaust gas is then increased to burn off and remove PM deposited in the filter. Further, the system described in the patent document 2 is so configured that automatic regeneration control which automatically starts regeneration to burn off and remove deposited PM can also be performed.

Patent document 1: JP-A-2005-120895
Patent document 2: JP-A-2006-37925

DISCLOSURE OF INVENTION

Problems to be Solved by the Invention

In the case of a diesel engine that employs DPF, PM is deposited in a filter. However, under normal conditions, the PM deposited in this filter is exposed to an exhaust gas whose temperature is high, and consequently, the PM is burnt off by itself. However, if a load placed on the engine is light, the temperature of the exhaust gas does not reach the high temperature. As a result, PM which cannot be burnt off by itself is gradually deposited in the filter, causing the filter to be clogged. Therefore, it is necessary to compulsorily burn off and remove the PM so that the filter is regenerated. As described above, the systems disclosed in the patent documents 1, 2 perform the manual regeneration control or the automatic regeneration control so that the temperature of an exhaust gas is increased to compulsorily burn off and remove PM, thereby regenerating a filter. These systems are put to practical use in transportation vehicles such as a track.

Incidentally, a travelling engineering vehicle such as a hydraulic excavator is also equipped with a diesel engine as a driving source. Also in this case, the travelling engineering vehicle is required to reduce the amount of emission of PM included in an exhaust gas of the diesel engine. To meet such a requirement, as is the case with the transportation vehicles such as a track, the exhaust gas cleaning system as described in the patent documents 1 and 2 has only to be applied to the diesel engine of the travelling engineering vehicle. However, if the exhaust gas cleaning system that is applied to the diesel engine of the transportation vehicles such as a track is applied to the diesel engine of the engineering vehicle just as it is, the following problems arise in the manual regeneration control.

Usually, in order to perform the manual regeneration control of an exhaust gas cleaning system, an operator operates a manual regeneration starting switch while a vehicle body is stopped. The manual regeneration starting switch is operated so that a regeneration unit is instructed to start regeneration (to start the operation of the regeneration unit). In this case, the system disclosed in the patent document 1 checks whether or not the vehicle body is kept in a stopped state on the basis of information about the vehicle speed, a position of a speed change lever, or the like. After it is checked that the vehicle body is kept in the stopped state, manual regeneration of a filter is executed. This makes it possible to execute the manual regeneration of the filter only when the vehicle body is kept in the stopped state (that is to say, in a state in which transportation work is stopped). However, the travelling engineering vehicle such as a hydraulic excavator is a machine that is capable of carrying out work, such as digging, by moving a front work device, and the like, with a vehicle body stopped. Therefore, on the assumption that only a check as to whether or not the vehicle body is kept in a stopped state is made before the manual regeneration control is started, if the operator manipulates a control lever to drive a work system (hydraulic circuit unit) during the manual regeneration control, the manual regeneration control cannot be properly executed. In addition to it, there is a possibility that the manual regeneration control will exert an influence on the operation of the work system, causing a hindrance to the work.

An object of the present invention is to provide an exhaust gas cleaning system for an engineering vehicle, the exhaust gas cleaning system being capable of performing the manual regeneration control in a proper state in which the manual regeneration control of a filter for collecting particulate matter included in an exhaust gas and the operation of the work system do not influence each other in a travelling engineering vehicle such as a hydraulic excavator.

Means for Solving the Problems (1) In order to achieve the above object, according to the present invention, there is provided an exhaust gas cleaning system for an engineering vehicle, the engineering vehicle including: a diesel engine; driven bodies used for work, the driven bodies being driven by the motive power of the engine; first operation means for instructing the operation of the driven bodies used for work; and second operation means that is selectively operated between a first position at which the instruction by the first operation means is enabled and a second position at which the instruction by the first operation means is disabled; the exhaust gas cleaning system including: a filtering unit that is disposed in an exhaust system of the engine, the filtering unit including a filter for collecting particulate matter included in an exhaust gas; and regeneration units for increasing the temperature of the exhaust gas to burn off and remove particulate matter deposited in the filter, wherein the exhaust gas cleaning system further includes: third operation means for instructing start of the operation of the regeneration units; and a regeneration control unit for, when the second operation means is switched to the second position, and when the third operation means is operated to instruct the start of the operation of the regeneration units, starting the operation of the regeneration units.

Thus, the operation of the regeneration units (the manual regeneration control) is started on the basis of not only an operational state of the third operation means for instructing start of the operation of the regeneration units, but also an operational state of the second operation means for disabling the instruction by the first operation means. This eliminates the possibility that the manual regeneration control will be started in a state in which the work system (hydraulic circuit unit) can be operated. Accordingly, even if the first operation means is operated, the work system (hydraulic circuit unit) does not operate during the manual regeneration control. The manual regeneration control, therefore, can be performed in a proper state in which the manual regeneration control and the operation of the work system do not influence each other.

(2) In the above-described item (1), preferably, after the operation of the regeneration units starts, when the second operation means is switched to the first position, the regeneration control unit stops the operation of the regeneration units.

As a result, even when the manual regeneration control is being executed, if the second operation means is switched to the first position at which the instruction by the first operation means is enabled, the operation of the regeneration units stops. This makes it possible to immediately restart the work in a proper state in which the manual regeneration control and the operation of the work system do not influence each other.

(3) In addition, in the above-described item (1), preferably, the engineering vehicle further includes fourth operation means for instructing a target revolution speed of the engine; and when the second operation means is switched to the second position, and when the fourth operation means is operated such that the low-speed idle revolution speed is instructed as the target revolution speed, and when the third operation means is operated, the regeneration control unit starts the operation of the regeneration units, and controls the revolution speed of the engine such that this revolution speed is kept at the specified revolution speed.

As a result, when the manual regeneration control starts, the revolution speed of the engine increases to the specified revolution speed, whereas when the manual regeneration control ends, the revolution speed of the engine decreases to the low-speed idle revolution speed. Therefore, sound of the engine whose revolution speed has increased or decreased enables an operator to judge whether the manual regeneration control is being executed or has ended.

(4) Moreover, in the above-described item (1), preferably, the engineering vehicle further includes: fifth operation means for outputting an instruction signal used to control the revolution speed and torque of the engine so that the travelling speed is instructed and controlled; travelling systems connected to an output shaft of the engine; and sixth operation means used for parking, the sixth operation means being operated so that the travelling systems (235, 236) are braked when the engineering vehicle is parked. The regeneration control unit starts the operation of the regeneration units when the second operation means is switched to the second position, the sixth operation means is operated, and the third operation means is operated.

This eliminates the possibility that the manual regeneration control will be started in a state in which the work system and the travelling systems can be operated. Even if the first operation means or the fifth operation means is operated, the work system (hydraulic circuit unit) or travelling systems does not operate during the manual regeneration control. The manual regeneration control, therefore, can be performed in a proper state in which the manual regeneration control and the operation of the work system or the travelling systems do not influence each other.

(5) Furthermore, in the above-described item (1), preferably, the engineering vehicle further includes a hydraulic circuit unit including a hydraulic pump driven by the engine, and hydraulic actuators which are driven by oil discharged from the hydraulic pump so that the driven bodies used for work are driven; the filtering unit includes an oxidation catalyst that is disposed on the upstream side of the filter; each of the regeneration units includes fuel supply means for injecting regeneration fuel into the exhaust gas, and hydraulic pressure load generation means for placing a hydraulic load on the engine, the hydraulic pressure load generation means being disposed in the hydraulic circuit unit; and when the second operation means is switched to the second position, and when the third operation means is operated, the regeneration control unit operates the fuel supply means and the hydraulic pressure load generation means, and controls the revolution speed of the engine such that this revolution speed is kept at the specified revolution speed.

Thus, a load is placed on the engine by using the hydraulic circuit unit that is usually included in an engineering vehicle. The engine revolution speed is then controlled such that this engine revolution speed is kept at the specified revolution speed with the load placed on the engine. This causes the exhaust gas temperature of the engine to quickly increase to the temperature that is suitable for the activation of the oxidation catalyst. As a result, fuel injected into an exhaust gas efficiently reacts with the oxidation catalyst in the filtering unit so that reaction heat is generated. The reaction heat causes particulate matter deposited in the filter to be burnt off and removed. Therefore, the filter can be properly regenerated.

Effects of the Invention

According to the present invention, the operation of the regeneration unit (the manual regeneration control) is started on the basis of not only an operational state of the third operation means for instructing the start of the operation of the regeneration units; but also an operational state of the second operation means for disabling the instruction by the first operation means. This eliminates the possibility that the manual regeneration control will be started in a state in which the work system (hydraulic circuit unit) can be operated. Therefore, the manual regeneration control can be performed in a proper state in which the manual regeneration control of the filter for collecting particulate matter included in an exhaust gas and the operation of the work system do not influence each other in the travelling engineering vehicle such as a hydraulic excavator.

DESCRIPTION OF REFERENCE SYMBOLS

Figure 1:
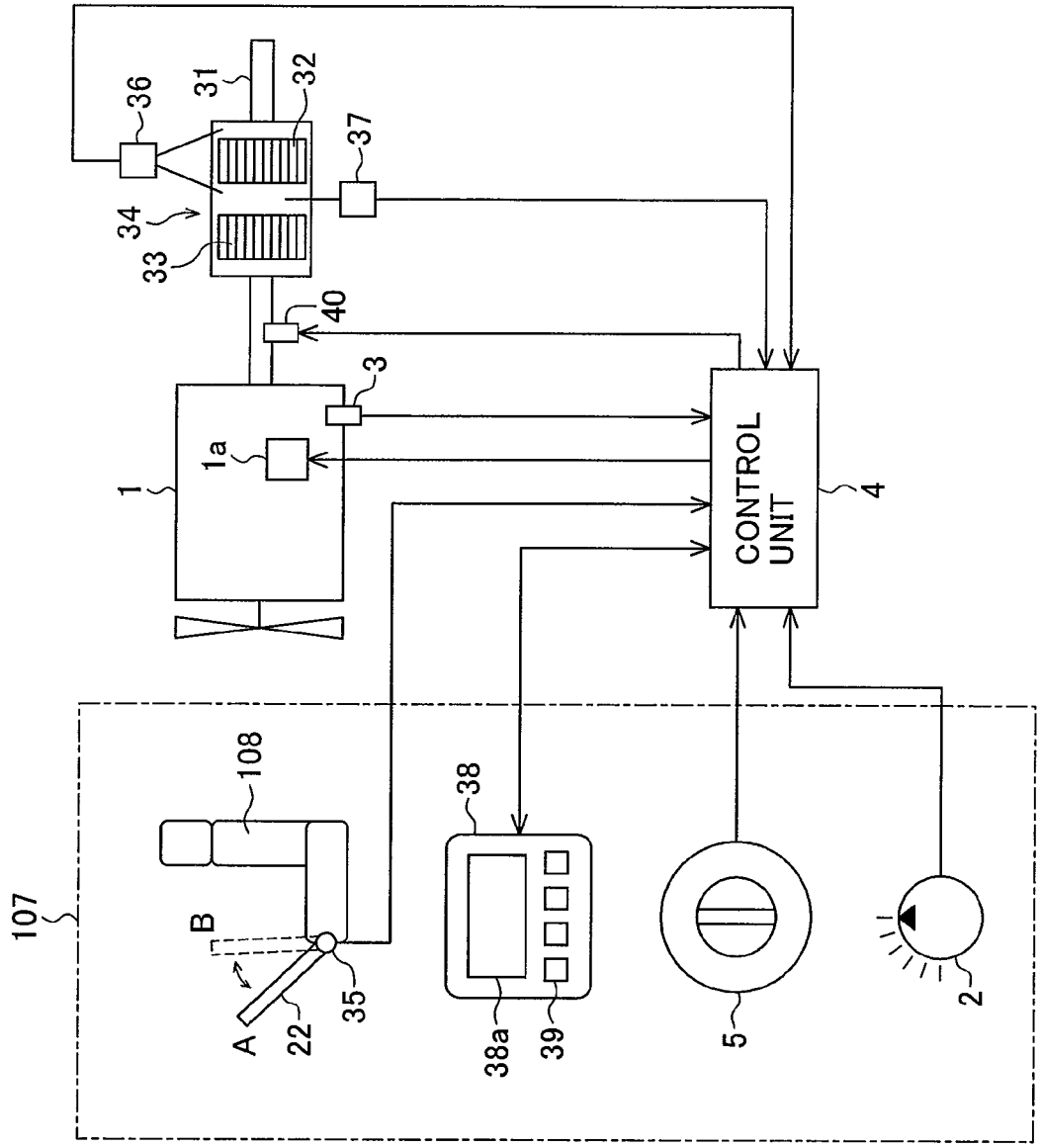
FIG. 1 is a diagram illustrating an overall configuration of an exhaust gas cleaning system for a construction machine according to a first embodiment of the present invention.

1 Diesel engine
1a Electronic governor
2 Engine control dial
2B Accelerator pedal
3 Revolution speed sensor
4, 4A, 4B Control unit
5 Key switch
11 Hydraulic pump
12 Pilot pump
11 Hydraulic motor
14, 15 Hydraulic cylinder
17 through 19 Flow control valve
20 Pilot hydraulic pressure source
21 Pilot relief valve
22 Gate lock lever
23 Electromagnetic switching valve
24 Pilot hydraulic line
25, 26, 27 Remote control valve
29 Main relief valve
31 Exhaust pipe
32 Filter
33 Oxidation catalyst
34 DPF unit
35 Position sensor
36 Differential pressure sensor
37 Exhaust-gas temperature sensor
38 Display unit (monitor)
38a Display screen
39 Manual regeneration starting switch
40 Regeneration fuel injector (regeneration unit)
41, 41A, 41B Vehicle-body control unit
42 Monitor control unit
43 Engine control unit
50 Electromagnetic switching valve (regeneration unit)
60 Parking brake operation device
61 Position sensor
100 Lower travel structure
101 Upper swing structure
102 Front work device
104a, 104b Travelling motor
105 Swing motor
106 Engine room
107, 107B Cabin
108 Driver's seat
111 Boom
112 Arm
113 Bucket
114 Boom cylinder
115 Arm cylinder
116 Bucket cylinder
200 Wheel loader
201 Vehicle front part
202 Vehicle rear part
204 Front work device
206 Driver's seat
207 Control lever unit
208 Handle
211 Bucket
212 Boom
213 Bucket cylinder
214 Boom cylinder

BEST MODES FOR CARRYING OUT THE INVENTION

Embodiments of the present invention will be described below with reference to the accompanying drawings.

FIG. 1 is a diagram illustrating an overall configuration of an exhaust gas cleaning system for an engineering vehicle according to a first embodiment of the present invention.

In FIG. 1, the engineering vehicle according to this embodiment is, for example, a hydraulic excavator that is an example of a construction machine. This hydraulic excavator has a diesel engine 1 (hereinafter merely referred to as an "engine") including an electronic governor 1a (an electronically-controlled fuel injection control unit). The target revolution speed of the engine 1 is instructed by an engine control dial 2 that is disposed in a cabin (operator's cab) 107 of the hydraulic excavator (refer to FIG. 4). The actual revolution speed of the engine 1 is detected by a revolution speed sensor 3. An instruction signal of the engine control dial 2 (fourth operation means) and a detection signal of the revolution speed sensor 3 are inputted into a control unit 4. The control unit 4 then controls the electronic governor 1a on the basis of the instruction signal (the target revolution speed) and the detection signal (the actual revolution speed) so that the revolution speed and torque of the engine 1 are controlled. In addition, a key switch 5 is disposed in the cabin 107 as an instruction unit for instructing the starting and stopping of the engine 1. An instruction signal of the key switch 5 is also inputted into the control unit 4. On the basis of the instruction signal, the control unit 4 controls a starter (not illustrated) and the electronic governor 1a so that the starting and stopping of the engine 1 are controlled. Further, a driver's seat 108 is disposed in the cabin 107 of the hydraulic excavator. A gate lock lever 22 (the second operation means) is provided on the front left side of the driver's seat 108 (on the entrance side of the cabin 107).

The engineering vehicle (hydraulic excavator) as described above is provided with the exhaust gas cleaning system according to this embodiment. The exhaust gas cleaning system includes: a DPF unit 34 disposed on the exhaust pipe 31 constituting a part of an exhaust system of the engine 1, that includes a filter 32 for collecting particulate matter included in an exhaust gas, and an oxidation catalyst 33 disposed on the upstream side of the filter 32; a position sensor 35 for detecting an operative position of the gate lock lever 22; a differential pressure sensor 36 for detecting the differential pressure between the upstream and downstream sides of the filter 32 (a pressure loss of the filter 32); an exhaust-gas temperature sensor 37 for detecting the temperature of an exhaust gas, the exhaust-gas temperature sensor 37 being disposed on the upstream of the filter; a display unit (monitor) 38 having a display screen 38a; a manual regeneration starting switch 39 (third operation means) that is provided in the display unit 38; and a regeneration fuel injector 40 that is disposed on the exhaust pipe 31 between the engine 1 and the DPF unit 34.

The regeneration fuel injector 40 constitutes a regeneration unit for the filter 32. The regeneration unit increases the temperature of the exhaust gas to burn off and remove PM (particulate matter) deposited in the filter 32. The manual regeneration starting switch 39 functions as operation means for instructing the regeneration fuel injector 40 (regeneration unit) to start the operation thereof (more specifically, the operation means instructs the start of the manual regeneration control of the filter 32). When the manual regeneration starting switch 39 is switched from an OFF position to an ON position, an instruction signal that instructs the start of the manual regeneration control is output.

Detection signals from the position sensor 35 and the exhaust-gas temperature sensor 37, and the instruction signal of the manual regeneration starting switch 39, are inputted into the control unit 4. On the basis of not only these inputted signals, but also an instruction signal from the engine control dial 2 and a detection signal of the revolution speed sensor 3, the control unit 4 performs computation of the manual regeneration control, and then controls the electronic governor 1a and the regeneration fuel injector 40 according to the result of the computation. In addition, the control unit 4 transmits pieces of information to the display unit 38 as display signals so that the pieces of information are displayed on the display screen 38a. The pieces of information includes: information obtained based on various kinds of signals received from the revolution speed sensor 3, the key switch 5, the position sensor 35, the differential pressure sensor 36, the exhaust-gas temperature sensor 37, and the manual regeneration starting switch 39; and information about the result of the computation for the manual regeneration control of the control unit 4. Information which is displayed on the display screen 38a by the display unit 38 includes the differential pressure across the filter 32 (a pressure loss of the filter 32) that has been detected by the differential pressure sensor 36. By judging whether a value of the differential pressure across the filter 32 exceeds a level at which forced regeneration of the filter 32 is required, an operator can judge whether or not the manual regeneration control is required.

Figure 2:
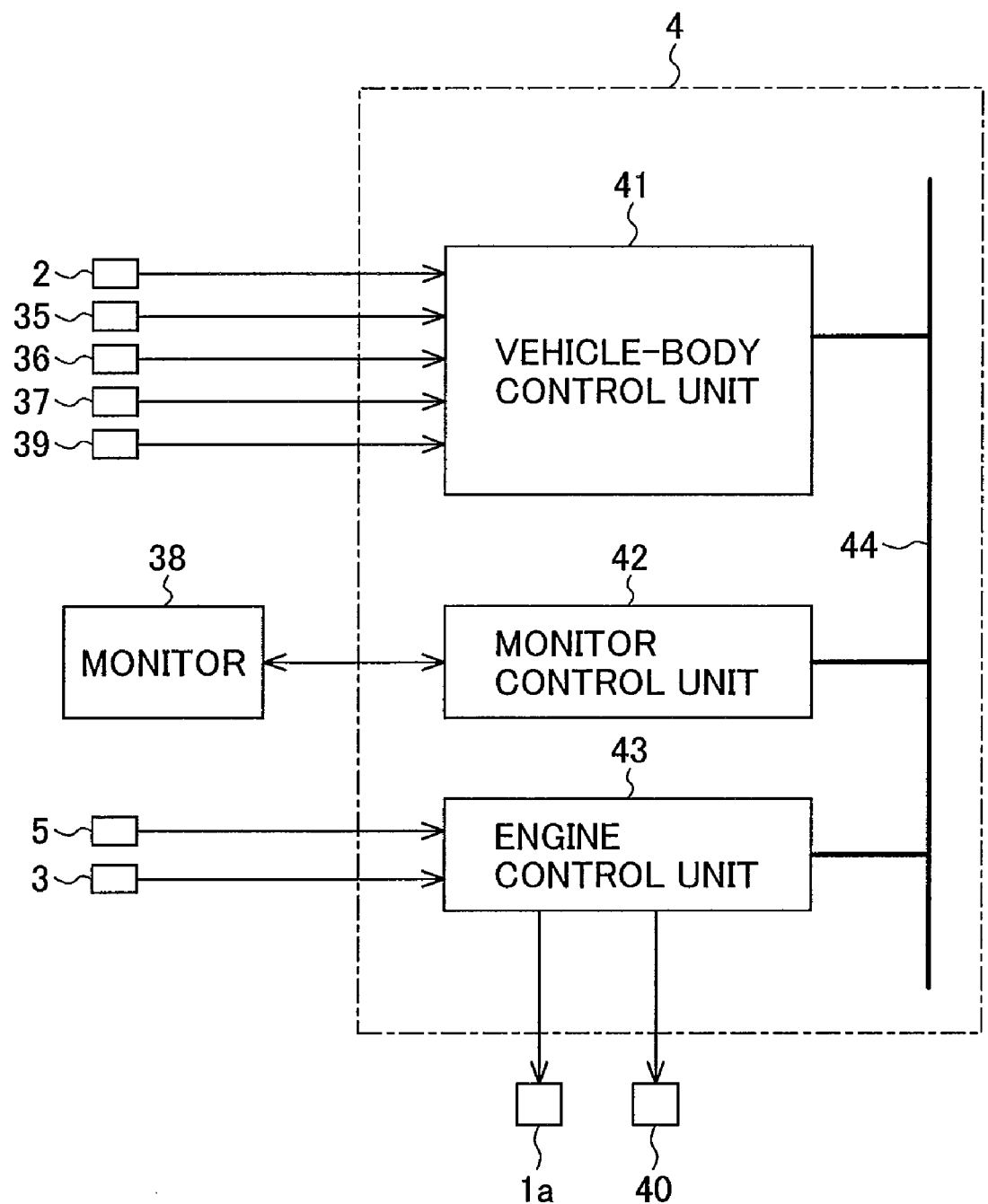
FIG. 2 is a diagram illustrating in detail a control unit included in the system shown in FIG. 1.

FIG. 2 is a diagram illustrating the control unit 4 in detail. The control unit 4 includes a vehicle-body control unit 41, a monitor control unit 42, and an engine control unit 43. These control units 41 through 43 are connected to one another through a communication line 44. They constitute a vehicle body network. A detection signal of the position sensor 35, an instruction signal of the manual regeneration starting switch 39, an instruction signal of the engine control dial 2, a detection signal of the differential pressure sensor 36, and a detection signal of the exhaust-gas temperature sensor 37 are inputted into the vehicle-body control unit 41. An instruction signal of the key switch 5 and a detection signal of the revolution speed sensor 3 are inputted into the engine control unit 43.

The engine control unit 43 receives an instruction signal of the engine control dial 2 through the communication line 44. On the basis of this instruction signal and the detection signal of revolution speed sensor 3, the engine control unit 43 then controls the revolution speed and torque of the engine 1 as described above. In addition, the engine control unit 43 controls the starter (not illustrated) and the electronic governor 1a on the basis of the instruction signal of the key switch 5 so that the starting and stopping of the engine 1 are controlled.

The vehicle-body control unit 41 receives the detection signal of the revolution speed sensor 3 through the communication line 44. Next, on the basis of this detection signal, the detection signal of the position sensor 35, the instruction signal of the manual regeneration starting switch 39, and the instruction signal of the engine control dial 2, the vehicle-body control unit 41 performs the computation for the manual regeneration control as described above, and then transmits a control signal corresponding to the computation result to the engine control unit through the communication line 44. The engine control unit 43 controls the electronic governor 1a and the regeneration fuel injector 40 in accordance with the control signal.

The monitor control unit 42 receives through the communication line 44, various kinds of signals from the revolution speed sensor 3, the key switch 5, the position sensor 35, the differential pressure sensor 36, the exhaust-gas temperature sensor 37, and the manual regeneration starting switch 39. The monitor control unit 42 also receives, through the communication line 44, information about the result of the computation for the manual regeneration control of the vehicle-body control unit 41. The monitor control unit 42 then transmits the signal information and the information about the computation result to the display unit 38 as display signals as described above so that the pieces of information are displayed on the display screen 38a.

Figure 3:
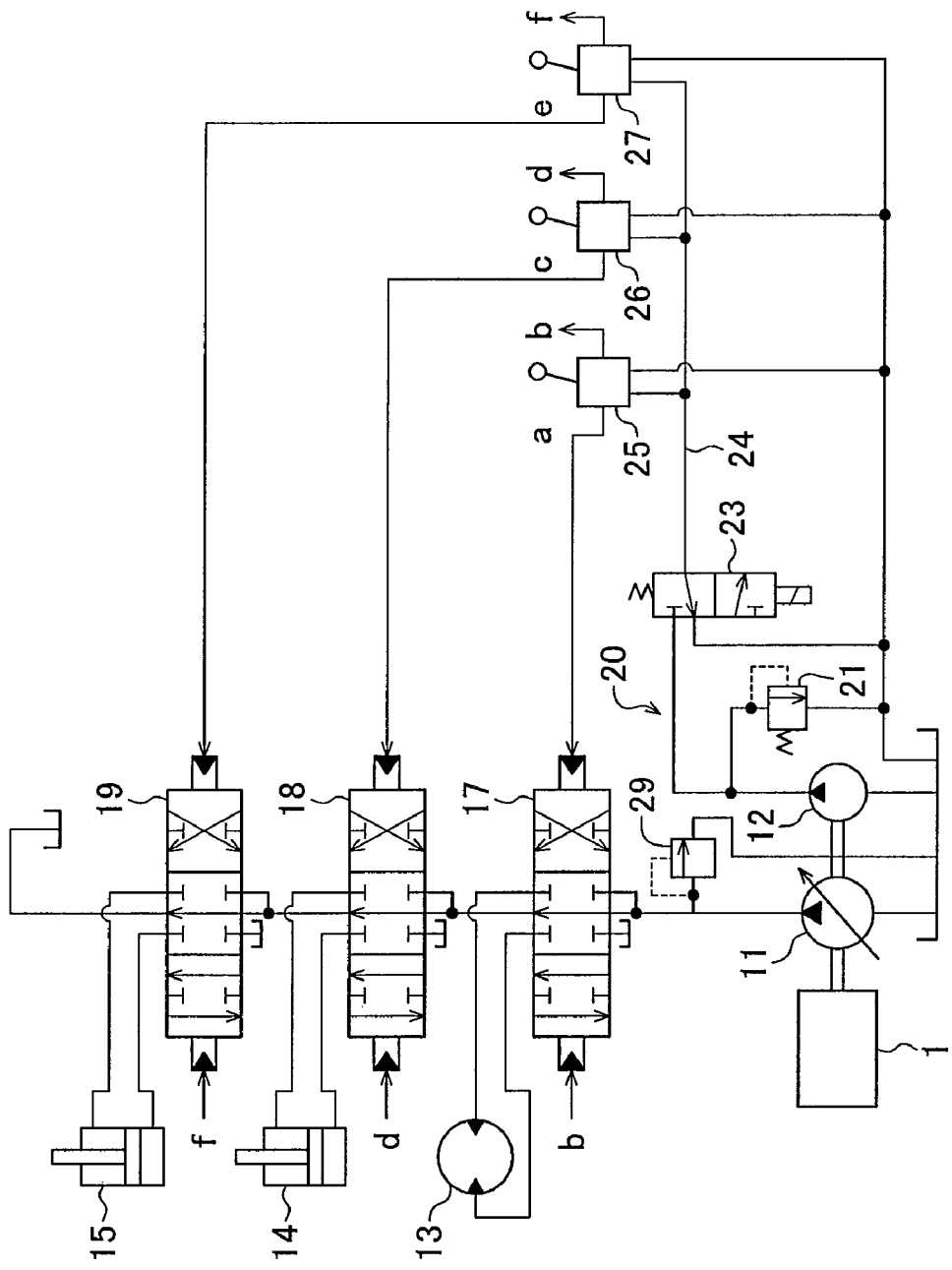
FIG. 3 is a diagram illustrating a hydraulic circuit unit with which the construction machine (for example, a hydraulic excavator) is equipped.

FIG. 3 is a diagram illustrating a hydraulic circuit unit included in the hydraulic excavator that is the engineering vehicle according to this embodiment. A hydraulic circuit unit of the hydraulic excavator includes: a main hydraulic pump 11 that is a variable capacity type hydraulic pump, and a pilot pump 12 that is a fixed capacity type pilot pump, both of the pumps 11, 12 being driven by the engine 1; a plurality of hydraulic actuators including a hydraulic motor 13 and hydraulic cylinders 14, 15, which are driven by pressure oil discharged from the hydraulic pump 11; a plurality of flow control valves (including a pilot-operated flow control valves 17 through 19) for controlling a flow (a flow rate and a direction) of the pressurized oil supplied from the hydraulic pump 11 to the hydraulic motor 13 and the hydraulic cylinders 14, 15; a pilot relief valve 21 for keeping the pressure of the pressurized oil discharged from the pilot pump 12 constant so that a pilot hydraulic pressure source 20 is formed; an electromagnetic switching valve 23 that is connected to the downstream side of the pilot hydraulic pressure source 20, and that is ON/OFF controlled in response to an open/close state of the gate lock lever 22 (shown in FIG. 1) provided on the entrance side of the driver's seat 108 of the hydraulic excavator (shown in FIG. 1); remote control valves 25, 26, and 27 (first operation means) for generating control pilot pressures a through f that are applied to operate flow control valves 17 through 19 with the hydraulic pressure of the pilot hydraulic pressure source 20 used as source pressure, the remote control valves 25, 26, and 27 being connected to the pilot hydraulic line 24 on the downstream side of the electromagnetic switching valve 23; and a main relief valve 29 that is used as safety means for specifying an upper limit of the discharge pressure of the main hydraulic pump 11. The remote control valves 25, 26, and 27 are built into left and right control lever units (not illustrated) disposed on the left and right sides of the driver's seat 108.

Figure 4:
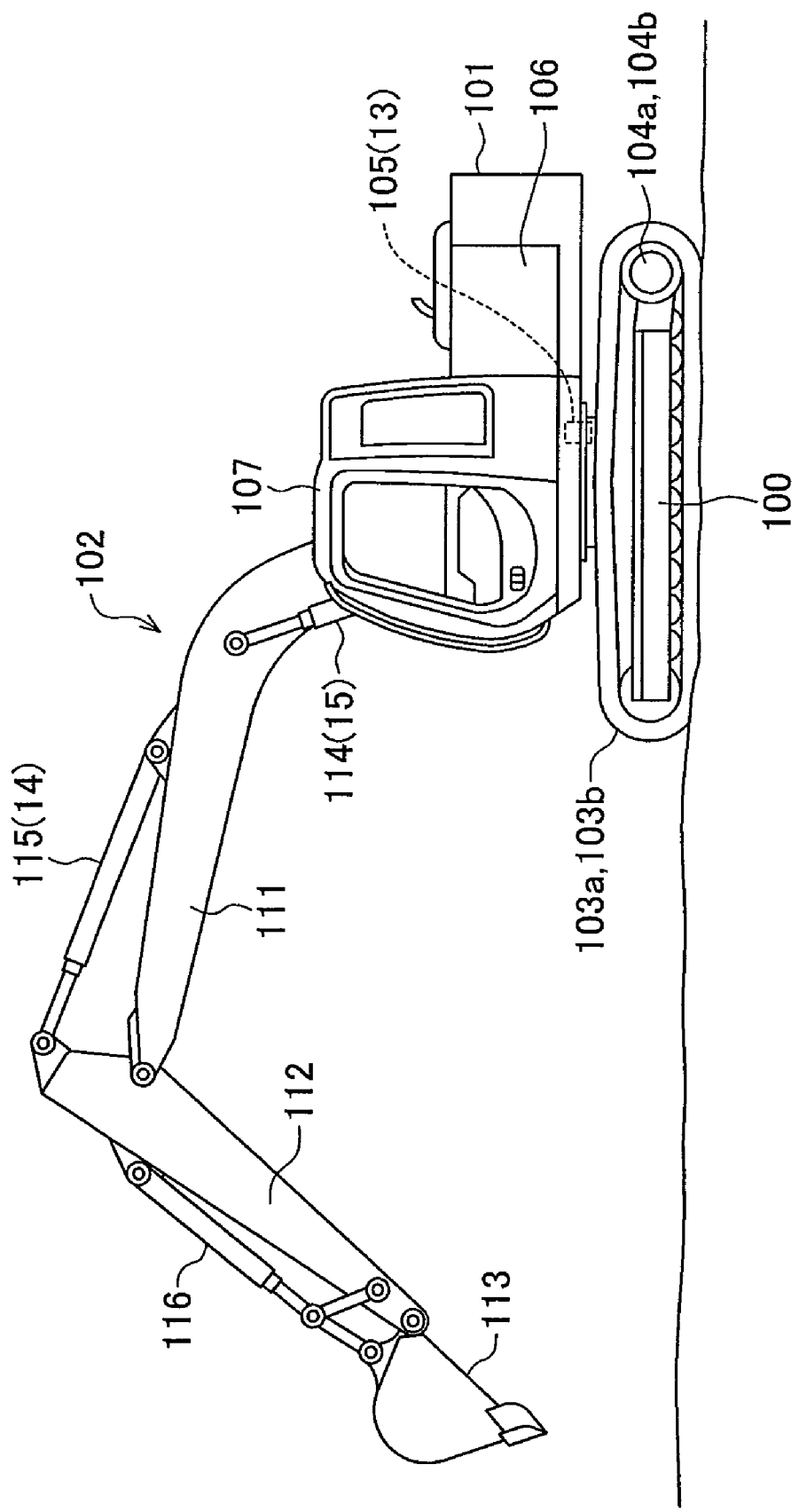
FIG. 4 is a diagram illustrating the appearance of the hydraulic excavator that is an example of the construction machine equipped with the hydraulic circuit unit shown in FIG. 3.

FIG. 4 is a diagram illustrating the appearance of a hydraulic excavator that is an example of the construction machine equipped with the hydraulic circuit unit shown in FIG. 3. The hydraulic excavator includes a lower travel structure 100, an upper swing structure 101, and a front work device 102. The lower travel structure 100 includes left and right crawler-type travel devices 103a and 103b, which are driven by left and right travelling motors 104a and 104b respectively. The upper swing structure 101 is mounted on the lower travel structure 100 in such a manner that the upper swing structure 101 can swing by a swing motor 105. The front work device 102 is mounted to a front portion of the upper swing structure 101 in such a manner that the front work device 102 can be elevated. The upper swing structure 101 is provided with an engine room 106 and a cabin (operator's cab) 107. The engine 1 is disposed in the engine room 106. A gate lock lever 22 (FIG. 1) is provided on the entrance side of the driver's seat 108 (FIG. 1) in the cabin 107. Control lever units (not illustrated) into which remote control valves 25, 26, and 27 are built are disposed on the left and right sides of the driver's seat 108. In addition, the engine control dial 2, the key switch 5, and the display unit 38 are disposed at proper positions in the cabin 107.

The front work device 102 is a multi-articulated structure including a boom 111, an arm 112, and a bucket 113. The expansion and contraction of a boom cylinder 114 causes the boom 111 to pivotally move in up and down directions. The expansion and contraction of an arm cylinder 115 causes the arm 112 to pivotally move in up and down directions and in forward and backward directions. The expansion and contraction of a bucket cylinder 116 causes the bucket 113 to pivotally move in up and down directions and in forward and backward directions.

In FIG. 3, the hydraulic motor 13 is, for example, the swing motor 105; the hydraulic cylinder 14 is, for example, the arm cylinder 115; and the hydraulic cylinder 15 is, for example, the boom cylinder 114. The hydraulic circuit unit shown in FIG. 3 is also provided with other hydraulic actuators and control valves, which correspond to the travelling motors 104a and 104b, the bucket cylinder 116, and the like. However, these elements are omitted in FIG. 3.

Returning to FIG. 1, the gate lock lever 22 can be selectively operated between a first position A (a lower position) at which the entrance of the driver's seat 108 is shut and a second position B (an upper position) at which the entrance of the driver's seat 108 is opened. When the gate lock lever 22 is kept at the first position A, a solenoid of the electromagnetic switching valve 23 is excited so that the electromagnetic switching valve 23 is switched from the illustrated position. This causes the pressure of the pilot hydraulic pressure source 20 to be introduced into the remote control valves 25, 26, and 27. As a result, the control pilot pressures a through f can be generated by the remote control valves 25, 26, and 27. This enables the operation of the flow control valves 17 through 19 based on the control pilot pressures a through f. When the gate lock lever 22 is operated such that the gate lock lever 22 is moved up to the second position B, the excitation of the solenoid of the electromagnetic switching valve 23 is disabled so as to switch the electromagnetic switching valve 23 to the illustrated position. This causes the communication between the pilot hydraulic pressure source 20 and the remote control valves 25, 26, and 27 to be interrupted, which makes it impossible to generate the control pilot pressures a through f by the remote control valves 25, 26, and 27. This disables the operation of the flow control valves 17 through 19 based on the control pilot pressures a through f. To be more specific, when the gate lock lever 22 is operated such that the gate lock lever 22 is moved up to the second position B, the remote control valve 25, 26, and 27 (control lever units) are brought into a locked state. A position of the electromagnetic switching valve 23 is switched by the gate lock lever 22. For example, this switching is achieved by providing an unillustrated switch between a solenoid of the electromagnetic switching valve 23 and a power supply unit. To be more specific, when the gate lock lever 22 is kept at the first position A, the switch is turned ON (closed) to excite the solenoid. In contrast, when the gate lock lever 22 is operated such that the gate lock lever 22 is moved to the second position B, the switch is turned OFF (opened) to disable the excitation of the solenoid.

Figure 5:
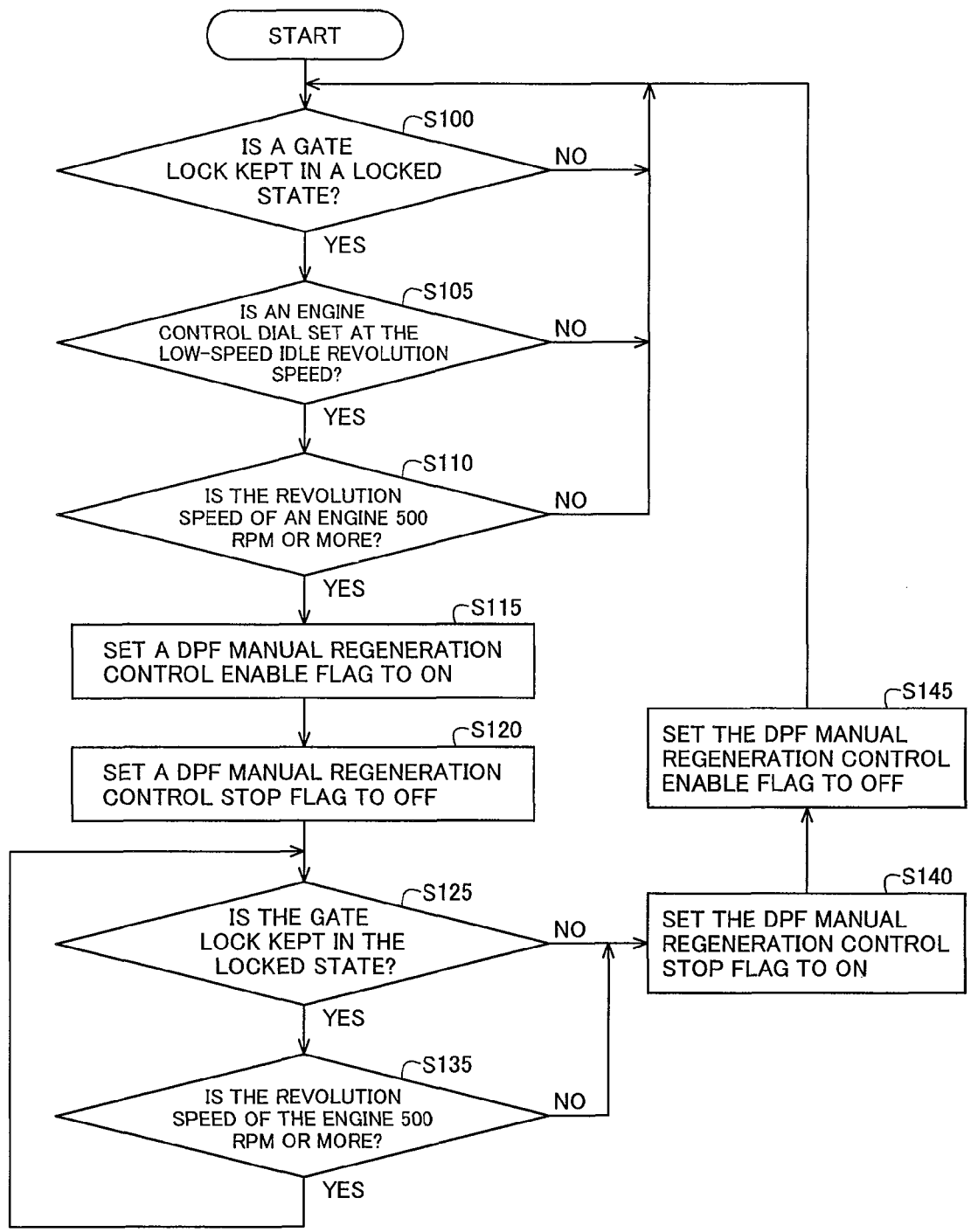
FIG. 5 is a flowchart illustrating how a vehicle-body control unit performs the computation for the manual regeneration control.
Figure 6:
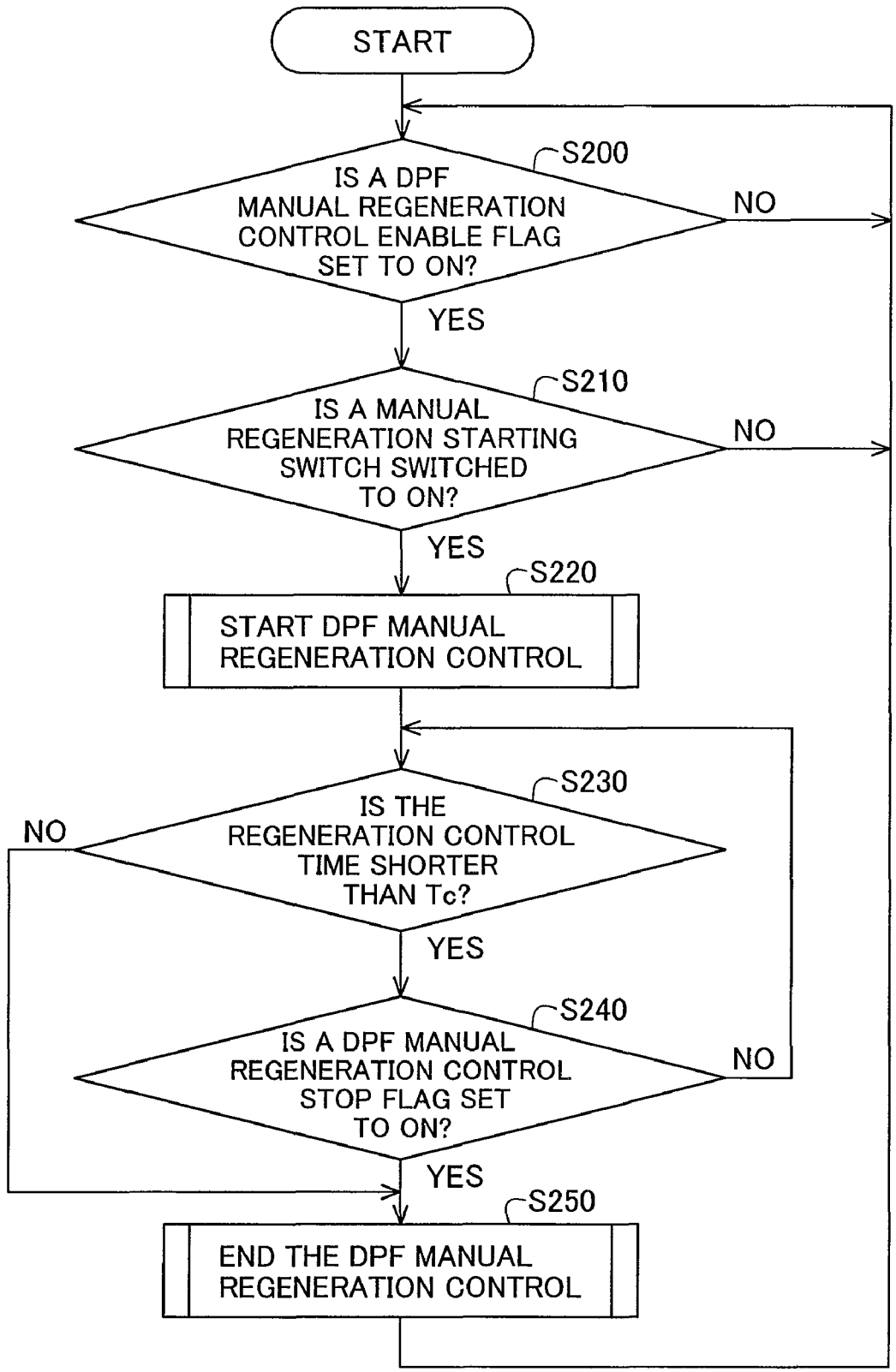
FIG. 6 is a flowchart illustrating how the vehicle-body control unit performs the computation for the manual regeneration control.

FIGS. 5 and 6 are flowcharts each illustrating how the vehicle-body control unit 41 carries out the computation of the manual regeneration control. The vehicle-body control unit 41 alternately executes computation shown in FIG. 5 and computation shown in FIG. 6 in a specified control cycle.

In FIG. 5, first of all, on the basis of a detection signal of the position sensor 35, the vehicle-body control unit 41 determines whether the gate lock lever 22 has been moved up to the second position B. In other words, the vehicle-body control unit 41 determines whether the gate lock lever 22 is kept in a locked state for the remote control valves 25, 26, and 27 (control lever units) (step S100). If it is determined that the gate lock lever 22 is kept at the second position B (the gate lock lever 22 is kept in a locked state), a determination is made, on the basis of an instruction signal from the engine control dial 2, as to whether the target revolution speed instructed by the engine control dial 2 is the low-speed idle revolution speed (low idling) (step S105). If it is determined that the target revolution speed instructed by the engine control dial 2 is the low-speed idle revolution speed (low idling), a determination is made, on the basis of a detection signal of the revolution speed sensor 3, as to whether the revolution speed of the engine 1 is 500 rpm or more (step S110). If it is determined that the revolution speed of the engine 1 is 500 rpm or more, a DPF manual regeneration control enable flag is set to ON (step S115), and at the same time, a DPF manual regeneration control stop flag is set to OFF (step S120). Here, the determination as to whether the revolution speed of the engine 1 is 500 rpm or more is made for the purpose of checking whether the engine 1 is currently working. The DPF manual regeneration control enable flag is a flag instructing the start of the DPF manual regeneration control, whereas the DPF manual regeneration control stop flag is a flag instructing the stop of the DPF manual regeneration control. If it is determined in step S100 that the gate lock lever 22 is not kept at the second position B (the gate lock lever 22 is not kept in a locked state), or if it is determined in step S105 that the target revolution speed instructed by the engine control dial 2 is not the low-speed idle revolution speed (low idling), or if it is determined in step S110 that the revolution speed of the engine 1 is less than 500 rpm, the process returns to the start, and then the determination processing in steps S100 through S110 is repeated.

In addition, after the DPF manual regeneration control stop flag is set to OFF in step S120, on the basis of a detection signal of the position sensor 35, a determination is made as to whether the gate lock lever 22 is kept at the second position B (more specifically, a determination is made as to whether the gate lock lever 22 is kept in a locked state for the remote control valves 25, 26, and 27 (control lever units)) (step S125). If it is determined that the gate lock lever 22 is kept at the second position B (the gate lock lever 22 is kept in a locked state), a determination is made, on the basis of a detection signal of the revolution speed sensor 3, as to whether or not the revolution speed of the engine 1 is 500 rpm or more (step S135). If it is determined that the revolution speed of the engine 1 is 500 rpm or more, the determination processing in steps S125 through S135 is repeated. As is the case with the above example, the determination as to whether the revolution speed of the engine 1 is 500 rpm or more is made for the purpose of checking whether the engine 1 is currently working. If it is determined in step S125 that the gate lock lever 22 is not kept at the second position B (in the locked state) (in other words, the gate lock lever 22 is kept at the first position A), or if it is determined in step S135 that the revolution speed of the engine 1 is less than 500 rpm, the DPF manual regeneration control stop flag is set to ON (step S140), and at the same time, the DPF manual regeneration control enable flag is set to OFF (step S145).

In FIG. 6, first of all, the engine control unit 41 determines whether a manual regeneration control enable flag is set to ON (step 200). If it is determined that the manual regeneration control enable flag is set to ON, a determination is made as to whether the manual regeneration starting switch 39 is kept at an ON position (step 210). If it is determined that the manual regeneration starting switch 39 is kept at the ON position, DPF manual regeneration control is started (step 220). If it is determined in step S200 that the manual regeneration control enable flag is not set to ON (in other words, the manual regeneration control enable flag is set to OFF), or if it is determined in step 210 that the manual regeneration starting switch 39 is not kept at the ON position (in other words, the manual regeneration starting switch 39 is kept at an OFF position), the determination processing in steps S200 and S210 is repeated. If the DPF manual regeneration control is started in step S220, a determination is made as to whether or not the time elapsed after the start of the DPF manual regeneration control (the regeneration control time) has reached the specified length of time Tc (step 230). If it is determined that the regeneration control time has reached the specified length of time Tc, the DPF manual regeneration control is stopped (step 250). In addition, if it is determined in step S230 that the regeneration control time has not reached the specified length of time Tc, a further determination is made as to whether the DPF manual regeneration control stop flag is set to ON (step 240). If it is determined that the DPF manual regeneration control stop flag is set to ON, the DPF manual regeneration control is stopped (step 250). If it is determined in step S230 that the DPF manual regeneration control stop flag is not set to ON (in other words, the DPF manual regeneration control stop flag is set to OFF), the determination processing in steps S230 through S240 is repeated.

In step S230, a determination is made as to whether the regeneration control time has reached the specified length of time Tc. Then, in accordance with the result of the determination, the DPF manual regeneration control is stopped. However, it may also be so configured that on the basis of a detection signal of the differential pressure sensor 36, a determination is made as to whether the differential pressure across the filter 32 (a pressure loss of the filter 32) is lower than a specified value, and if the differential pressure across the filter 32 is determined to be lower than the specified value, the regeneration control is stopped.

Next, an example of how to execute the DPF manual regeneration control in step S220 will be described as below. First of all, the revolution speed of the engine 1 is controlled such that the revolution speed is kept at specified revolution speed Na suitable for the forced regeneration control. The specified revolution speed Na suitable for the forced regeneration control is the revolution speed that can cause the temperature of an exhaust gas at that point of time to increase to the temperature higher than the activation temperature of the oxidation catalyst 33. The specified revolution speed Na is, for example, the medium-speed revolution speed whose value is about 1800 rpm. Under this control, the vehicle-body control unit 41 switches the target revolution speed of the engine 1 from the target revolution speed instructed by the engine control dial 2 (the low-speed idle revolution speed) to the specified revolution speed Na, and then transmits the specified revolution speed Na (the target revolution speed) to the engine control unit 43 through the communication line 44. On the basis of the target revolution speed (the specified revolution speed Na), and the actual revolution speed of the engine 1 detected by the revolution speed sensor 3, the engine control unit 43 feeds back the fuel injection quantity of the electronic governor 1a to control the revolution speed of the engine 1 such that the revolution speed is kept at the specified revolution speed Na.

Next, if it is determined that the exhaust gas temperature detected by the exhaust-gas temperature sensor 37 has increased to the specified temperature (the temperature that is higher than the activation temperature of the oxidation catalyst 33), the regeneration fuel injector 40 is controlled such that fuel is injected into the exhaust pipe 31. As a result of the fuel injection into the exhaust pipe 31, the oxidation catalyst 33 is supplied with unburned fuel. This causes the unburned fuel to be oxidized with the oxidation catalyst 33. Reaction heat generated by the oxidation further increases the exhaust gas temperature, causing PM deposited in the filter 32 to be burnt off and removed.

In step S250, the DPF manual regeneration control is stopped by setting the target revolution speed back to the target revolution speed instructed by the engine control dial 2 (the low-speed idle revolution speed) so that the control of the regeneration fuel injector 40 is stopped. Instead of setting the target revolution speed back to the target revolution speed instructed by the engine control dial 2 (the low-speed idle revolution speed), the engine 1 may also be stopped.

Next, the operation of the exhaust gas cleaning system according to this embodiment as configured above will be described.

The exhaust gas cleaning system according to this embodiment allows the manual regeneration control to be performed when for example the differential pressure across the filter 32 (a pressure loss of the filter 32), which is displayed on the screen 38a of the display unit 38, exceeds a value at which the forced regeneration of the filter 32 is required, causing an operator to judge that the regeneration of the filter 32 is required. In another case, the exhaust gas cleaning system allows the manual regeneration control to be performed when work is interrupted (for example, during a break). When the manual regeneration control is carried out, the engine 1 is driven with the key switch 5 kept in an ON state. First of all, the operator operates the engine control dial 2 to decrease the target revolution speed of the engine 1 to the low-speed idle revolution speed, and moves up the gate lock lever 22 from the first position A to the second position B. As a result of the above operation, the vehicle-body control unit 41 sets the DPF manual regeneration control enable flag to ON, and sets the DPF manual regeneration control stop flag to OFF as illustrated in the flowchart shown in FIG. 5 (more specifically, steps S100->S105->S110->S115->S120). Next, the operator switches the manual regeneration starting switch 39 to an ON position so as to start the manual regeneration control. In the flowchart shown in FIG. 6, the vehicle-body control unit 41 determines that the DPF manual regeneration control enable flag is set to ON, and that the manual regeneration starting switch 39 is kept at an ON position; and consequently, the vehicle-body control unit 41 starts the DPF manual regeneration control (steps S200->S210->S220). Under this manual regeneration control, the revolution speed of the engine 1 is controlled such that the revolution speed in question is kept at the specified revolution speed Na suitable for the forced regeneration control as described above. As a result, the engine revolution speed increases. The sound of the engine 1 whose revolution speed has increased enables the operator to recognize that the manual regeneration control has started.

After a lapse of the specified length of time Tc since the start of the DPF manual regeneration control, the vehicle-body control unit 41 ends the manual regeneration control (steps S230->S250). At this point of time, the target revolution speed of the engine 1 returns from the revolution speed Na suitable for the forced regeneration control to the target revolution speed instructed by the engine control dial 2 (the low-speed idle revolution speed). The sound of the engine 1 whose revolution speed has decreased enables the operator to recognize that the manual regeneration control has ended.

In addition, if the operator is required to restart the work in a situation in which the manual regeneration control is being executed, as is the case with the ordinary restart of work, the operator operates the gate lock lever 22 such that the gate lock lever 22 is moved down from the second position B to the first position A. Thus, if the gate lock lever 22 is operated as described above, the vehicle-body control unit 41 sets the DPF manual regeneration control stop flag to ON, and sets the DPF manual regeneration control enable flag to OFF as illustrated in the flowchart shown in FIG. 5 (steps S125->S140->S145). In addition, if the DPF manual regeneration control stop flag is switched from OFF to ON, the vehicle-body control unit 41 determines that the DPF manual regeneration control stop flag is set to ON, and consequently, the vehicle-body control unit 41 stops the DPF manual regeneration control, as illustrated in the flowchart shown in FIG. 6 (steps S240->S250). Again, at this point of time, the target revolution speed of the engine 1 returns to the low-speed idle revolution speed instructed by the engine control dial 2. Therefore, the sound of the engine 1 whose revolution speed has decreased enables the operator to recognize that the manual regeneration control has ended.

According to the embodiment configured as described above, the following effects are produced.

(a) The operation of the regeneration fuel injector 40 (regeneration unit) is started after checking not only an operational state of the manual regeneration starting switch 39 but also an operational state of the gate lock lever 22 used to disable the generation of the control pilot pressures a through f by use of the remote control valves 25, 26, and 27. This eliminates the possibility that the manual regeneration control will be started in a state in which the hydraulic circuit unit shown in FIG. 3 constituting a part of a work system can operate. Even if the remote control valves 25, 26, and 27 are operated, the work system (hydraulic circuit unit) does not operate during the manual regeneration control. Accordingly, the manual regeneration control can be performed in a proper state in which the manual regeneration control and the operation the work system do not influence each other.

(b) Even when the manual regeneration control is being executed, if the gate lock lever 22 is operated such that the gate lock lever 22 is moved to the first position A (a position at which the flow control valves 17 through 19 can be operated by use of the remote control valves 25, 26, and 27), the operation of the regeneration fuel injector 40 (regeneration unit) stops. This makes it possible to immediately restart work in which the manual regeneration control and the operation of the work system do not influence each other.

(c) Start conditions of the manual regeneration control also includes the low-speed idle revolution speed that is used as the target revolution speed instructed by the engine control dial 2. Therefore, when the manual regeneration control is started, the revolution speed of the engine 1 increases to the specified revolution speed Na, whereas when the manual regeneration control ends, the revolution speed of the engine 1 decreases to the low-speed idle revolution speed. Accordingly, sound of the engine 1 whose revolution speed has increased or decreased enables the operator to judge whether the manual regeneration control is being executed or has ended.

A second embodiment of the present invention will be described with reference to FIGS. 7 through 10. Similar reference numerals are used in FIGS. 7 through 10 to designate parts that are similar to those shown in FIGS. 1 through 3, and FIG. 6.

Figure 7:
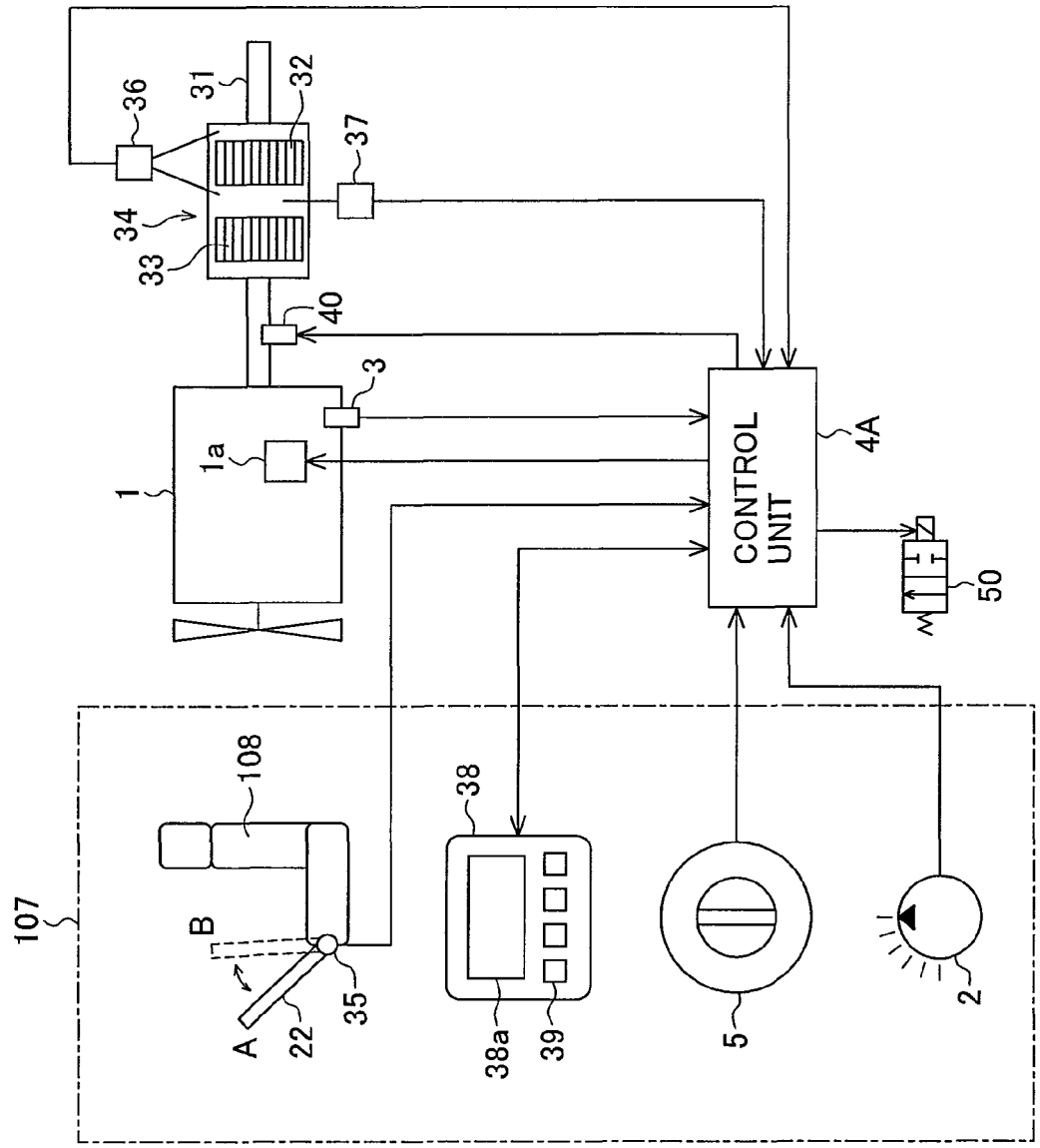
FIG. 7 is a diagram illustrating an overall configuration of an exhaust gas cleaning system for a construction machine according to a second embodiment of the present invention.
Figure 8:
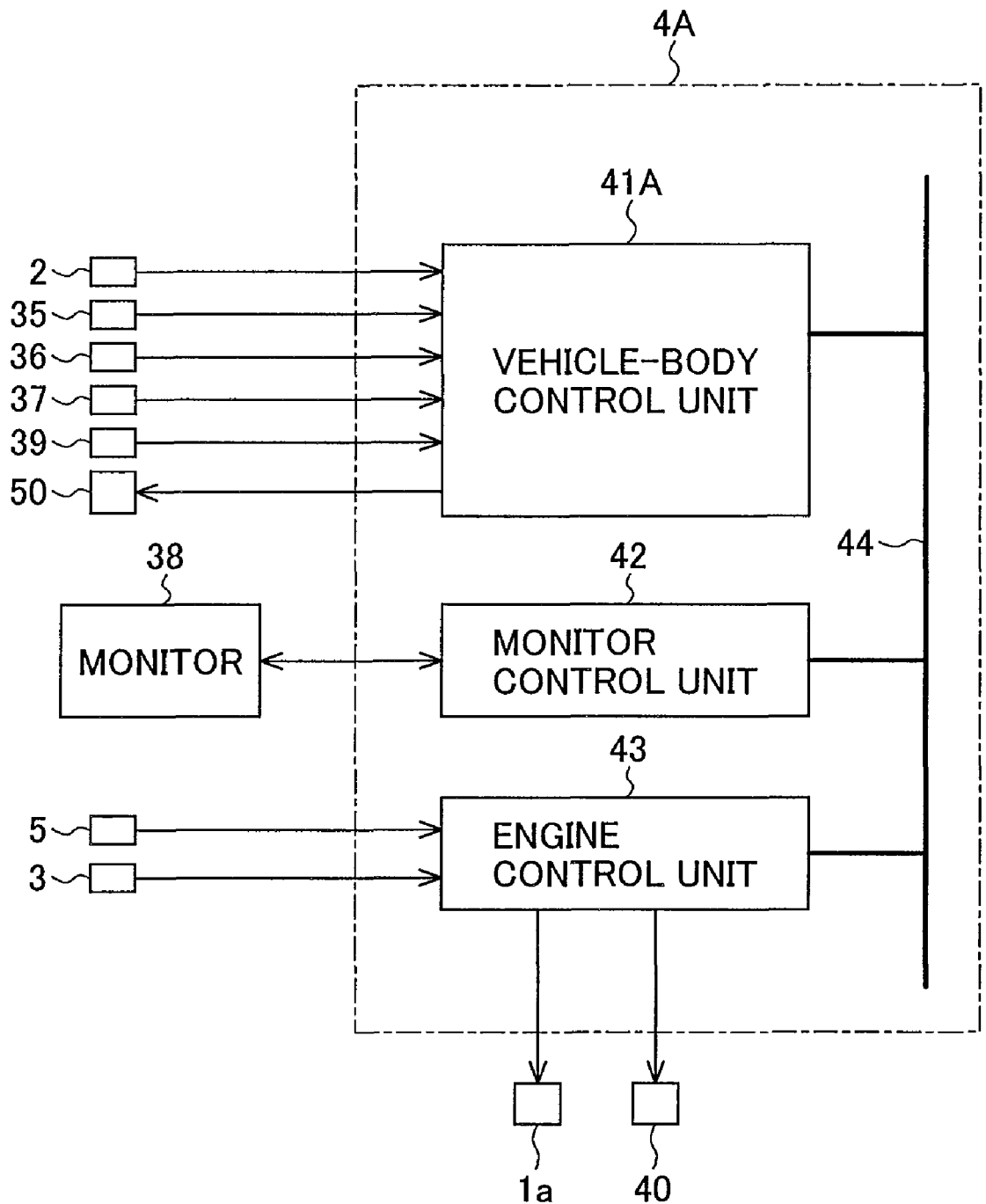
FIG. 8 is a diagram illustrating in detail a control unit included in the system shown in FIG. 7.

FIG. 7 is a diagram illustrating an overall configuration of an exhaust gas cleaning system included in an engineering vehicle according to this embodiment. FIG. 8 is a diagram illustrating in detail a control unit of the exhaust gas cleaning system. The exhaust gas cleaning system according to this embodiment further includes en electromagnetic switching valve 50. A vehicle-body control unit 41A constituting a part of the control unit 4A controls the electromagnetic switching valve 50 according to the computation result of the manual regeneration control, and then transmits a control signal corresponding to the computation result to the engine control unit 43 through the communication line 44. The engine control unit 43 controls the electronic governor 1a and the regeneration fuel injector 40 according to the control signal.

Figure 9:
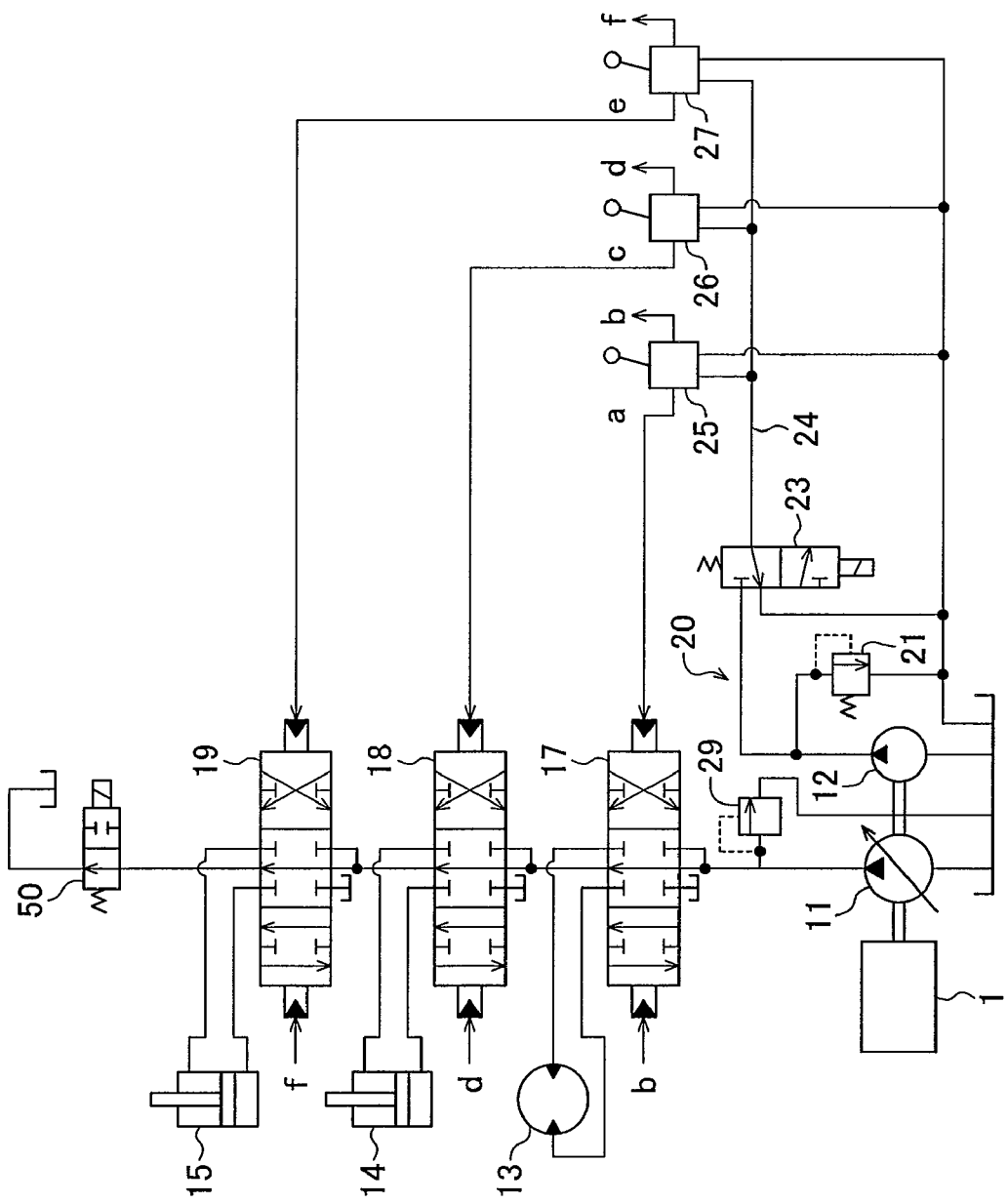
FIG. 9 is a diagram illustrating a hydraulic circuit unit with which the construction machine (for example, a hydraulic excavator) is equipped.

FIG. 9 is a diagram illustrating a hydraulic circuit unit included in the hydraulic excavator that is the engineering vehicle according to this embodiment. In this hydraulic circuit unit, a plurality of flow control valves (including the flow control valve 17 through 19) are center-bypass flow control valves. These flow control valves are connected in series to a center bypass line 51 leading to a discharge hydraulic line of the hydraulic pump 11. A portion 51a located on the farthest downstream side of the center bypass line 51 is connected to a tank T. In addition, the electromagnetic switching valve 50 is connected to the portion 51a located on the farthest downstream side of the center bypass line 51. The electromagnetic switching valve 50 is a two-position switching valve that is switchable between open and closed positions. If no ON signal is transmitted from the vehicle-body control unit 41A, and accordingly a solenoid is not excited, the electromagnetic switching valve 50 is switched to the open position shown in the figure. In contrast, if an ON signal is transmitted from the vehicle-body control unit 41A, which causes the solenoid to be excited, the electromagnetic switching valve 50 is switched from the open position to the closed position shown in the figure. The electromagnetic switching valve 50 and the regeneration fuel injector 40 constitute a regeneration unit.

Figure 10:
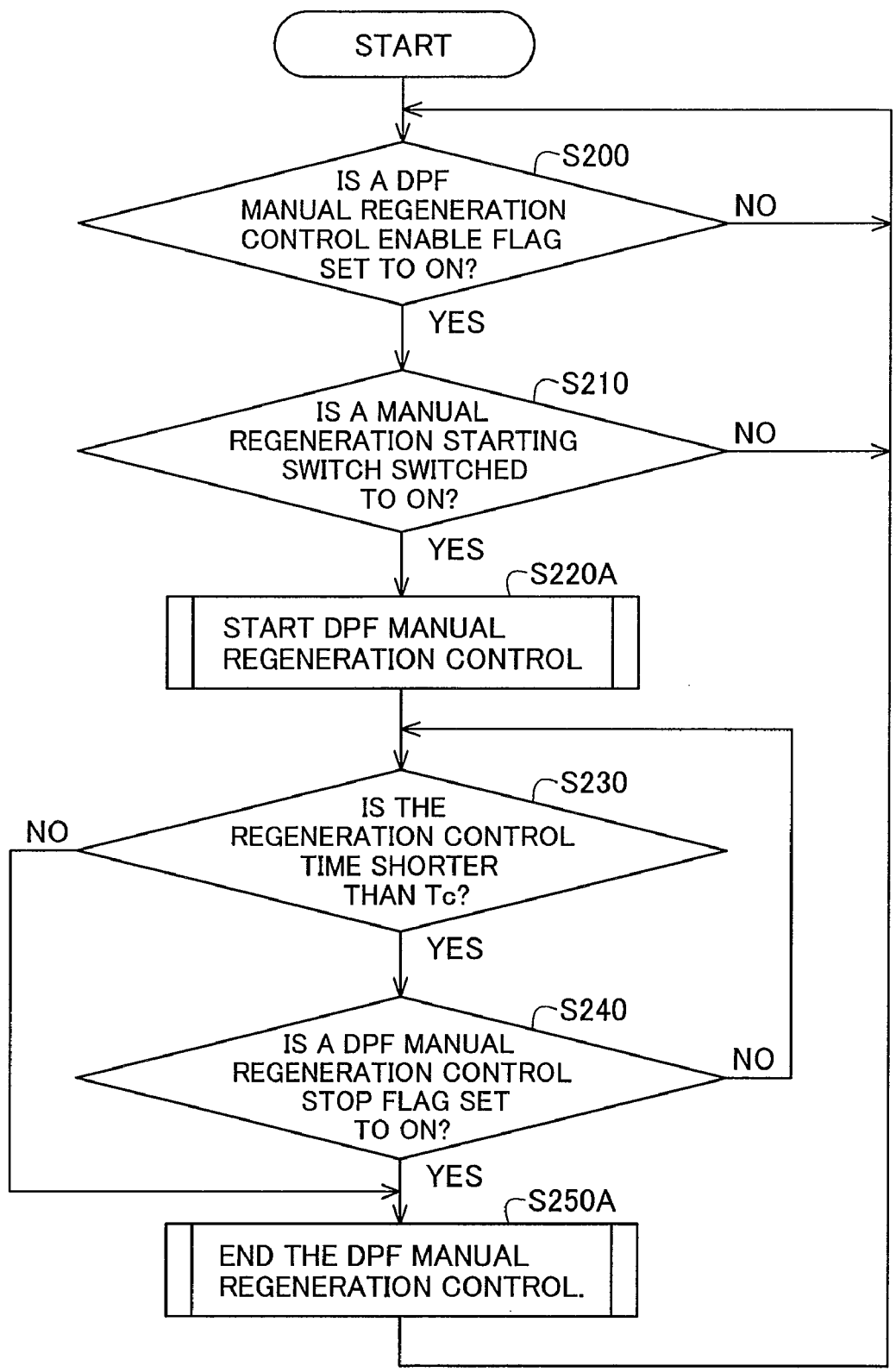
FIG. 10 is a flowchart illustrating how the vehicle-body control unit performs the computation for the manual regeneration control.

FIG. 10 is a flowchart illustrating a part of the computation performed for the manual regeneration control of the vehicle-body control unit 41A according to this embodiment, the part corresponding to the flowchart shown in FIG. 6. Points of difference between the flowcharts shown in FIGS. 6 and 10 are processing performed in step S220A and processing performed in step S250A.

To be more specific, according to this embodiment, the manual regeneration control is started in step S220A as described below.

First of all, the revolution speed of the engine 1 is controlled such that the revolution speed is kept at the specified revolution speed Na suitable for the forced regeneration control (for example, the medium-speed revolution speed whose value is about 1800 rpm). Simultaneously with this, an ON signal is transmitted to the electromagnetic switching valve 50 so that the electromagnetic switching valve 50 is switched from the open position to the closed position. This causes the discharge pressure of the hydraulic pump 11 to increase to the set pressure of the main relief valve 29. Because the engine 1 drives the hydraulic pump 11, the load torque of the engine 1 increases. As a result, the exhaust gas temperature of the engine 1 increases.

Next, if it is judged that the exhaust gas temperature detected by the exhaust-gas temperature sensor 37 has increased to the specified temperature (the temperature that is higher than the activation temperature of the oxidation catalyst 33), the regeneration fuel injector 40 is controlled so as to perform fuel injection into the exhaust pipe 31, which causes unburned fuel to be oxidized with the oxidation catalyst 33. Consequently, the exhaust gas temperature further increases, causing PM deposited in the filter 32 to be burnt off and removed.

Further, when the manual regeneration control is stopped in step S250A, the target revolution speed is set back to the target revolution speed instructed by the engine control dial 2 (the low-speed idle revolution speed) so that the control of the regeneration fuel injector 40 is stopped, and at the same time, a signal transmitted to the electromagnetic switching valve 50 is switched OFF so that the electromagnetic switching valve 50 is switched to the open position. Also in this case, instead of setting the target revolution speed back to the target revolution speed instructed by the engine control dial 2 (the low-speed idle revolution speed), the engine 1 may also be stopped.

According to this embodiment, which is configured as described above, not only the effects (a) through (c) obtained in the first embodiment but also the following effects can be achieved.

According to this embodiment, as soon as the manual regeneration control is started, the revolution speed of the engine 1 is controlled such that the revolution speed increases to the specified revolution speed Na. Concurrently with this, the electromagnetic switching valve 50 is switched to the closed position, which causes a load of the hydraulic pump 11 to increase, resulting in an increase in load torque of the engine 1. Accordingly, the exhaust gas temperature of the engine 1 quickly increases to the temperature that is suitable for the activation of the oxidation catalyst 33. Next, because the regeneration fuel injector 40 injects fuel into an exhaust gas with the above state kept as it is, unburned fuel contained in the exhaust gas is efficiently oxidized with the oxidation catalyst 33 in the DPF unit 34, and reaction heat generated at this point of time causes particulate matter deposited in the filter 32 to be certainly burnt off and removed. This makes it possible to regenerate the read filter 32 more properly.

A third embodiment of the present invention will be described with reference to FIGS. 11 through 13. Similar reference symbols are used in FIGS. 11 through 13 to designate parts that are similar to those shown in FIGS. 1, 2, 5, 7, and 8. This embodiment corresponds to a case where the present invention is applied to a wheel loader.

Figure 11:
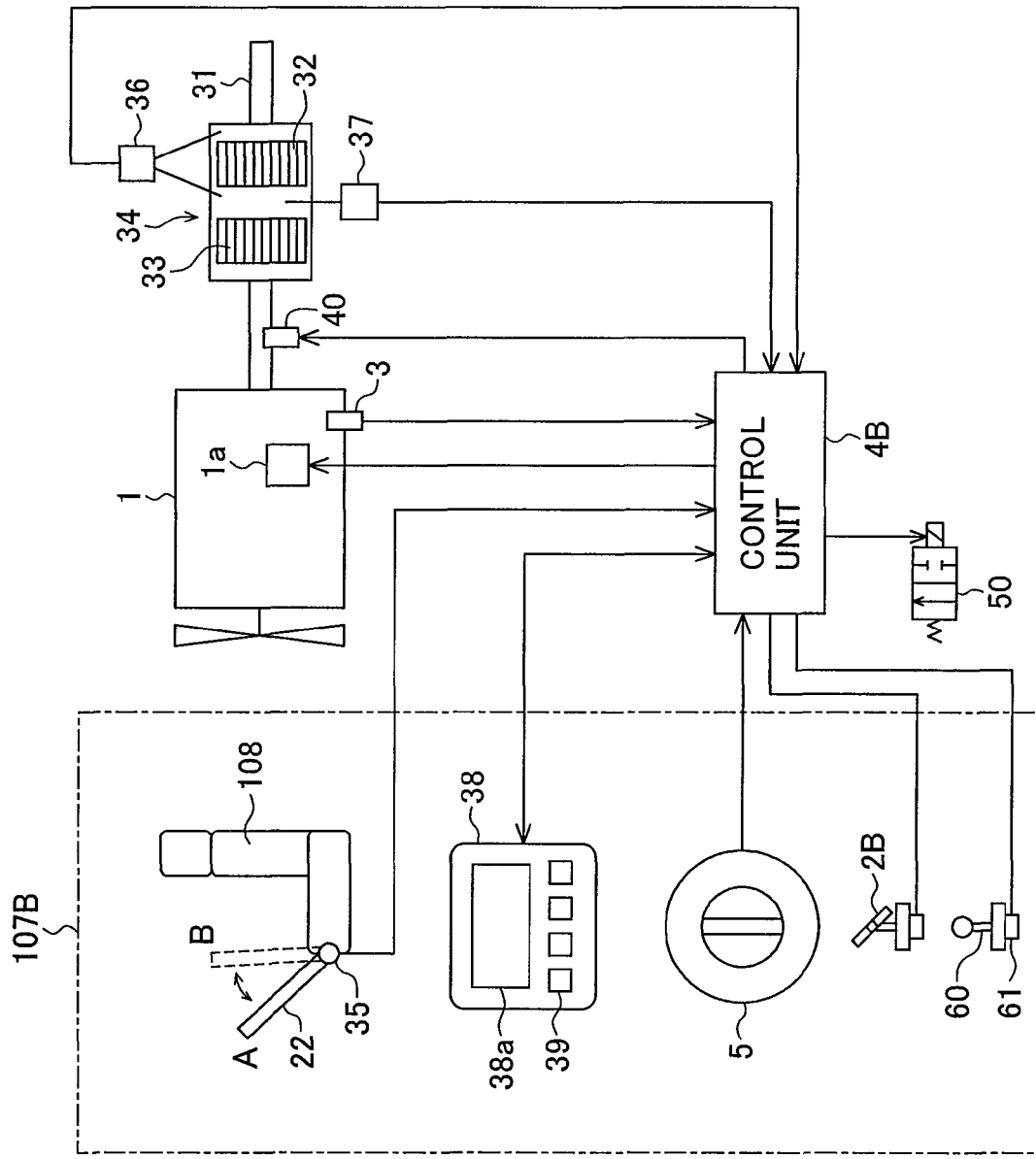
FIG. 11 is a diagram illustrating an overall configuration of an exhaust gas cleaning system for a construction machine according to a third embodiment of the present invention.
Figure 12:
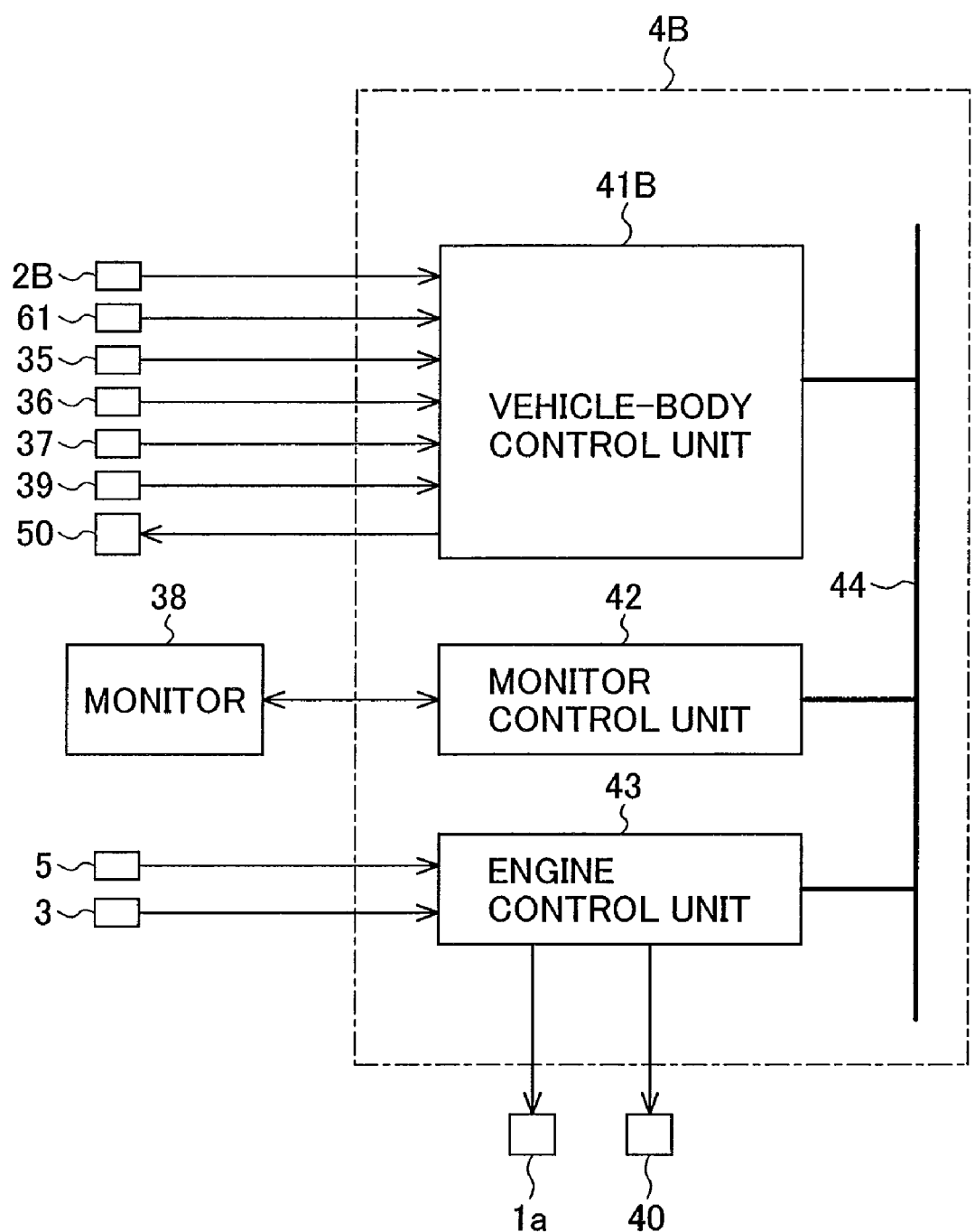
FIG. 12 is a diagram illustrating in detail a control unit included in the system shown in FIG. 11.

In FIGS. 11 and 12, an engineering vehicle according to this embodiment is a wheel loader. A cabin 206 of the wheel loader is provided with, instead of the engine control dial 2 (the fourth operation means) shown in FIG. 1, an accelerator pedal 2B as operation means (fifth operation means) for outputting an instruction signal used to control the revolution speed and torque of the engine 1 so that the travelling speed is controlled. The cabin 206 is further provided with a parking brake operation device 60 (sixth operation means) as control means used for parking. The parking brake operation device 60 is used to control a travelling system (described later). An instruction signal of the accelerator pedal 2B is inputted into a vehicle-body control unit 41B of the control unit 4B. The vehicle-body control unit 41B calculates the target revolution speed of the engine 1 on the basis of the instruction signal, and then transmits the target revolution speed to the engine control unit 43. The engine control unit 43 controls the electronic governor 1a on the basis of the target revolution speed and a detection signal (the actual revolution speed) of the revolution speed sensor 3 so as to control the revolution speed and torque of the engine 1. An output shaft of the engine 1 is connected to a travelling system. The travelling speed is controlled by controlling the revolution speed and torque of the engine 1. Moreover, the parking brake operation device 60 is provided with a position sensor 61 for detecting an operative position of the parking brake operation device 60. A detection signal of the position sensor 61 is also inputted into the vehicle-body control unit 41B constituting a part of the control unit 4B.

Figure 13:
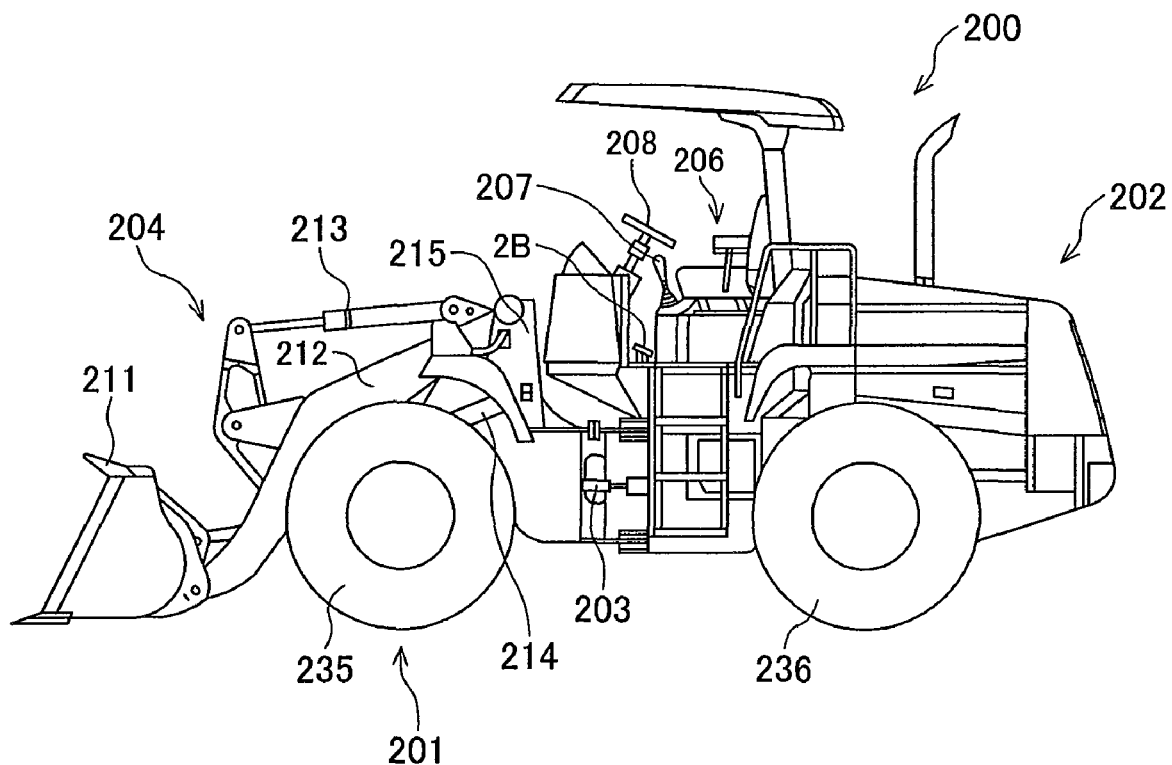
FIG. 13 is a diagram illustrating the appearance of a wheel loader that is an engineering vehicle according to this embodiment.

FIG. 13 is a diagram illustrating the appearance of the wheel loader that is the engineering vehicle according to this embodiment. Referring to FIG. 13, the wheel loader 200 includes a vehicle front part 201 and a vehicle rear part 202, both of which are pin-connected to each other in such a manner that the vehicle front part 201 and the vehicle rear part 202 can freely pivot with respect to each other. The vehicle front part 201 and the vehicle rear part 202 constitute a vehicle body. The vehicle front part 201 is equipped with a front work device 204. The vehicle rear part 202 is equipped with the driver's seat 206. The driver's seat 206 is provided with operation means including not only the accelerator pedal 2B and the parking brake operation device 60 (not illustrated), which are described above, but also a control lever unit 207 and a handle 208. In addition, front wheels 235 and rear wheels 236 are mounted to the vehicle front part 201 and the vehicle rear part 202 respectively. The vehicle rear part 202 is equipped with devices including the engine 1, the hydraulic pump 11, and the controller 4B. The front wheels 235 and the rear wheels 236 are connected to the output shaft of the engine 1 through a torque converter and a transmission, which are not illustrated. The front wheels 235 and the rear wheels 236 constitute a part of the above-described travelling system. When the accelerator pedal 2B is pressed down, the revolution speed and torque of the engine 1 increase. The motive power of the engine 1 is then transferred to the front wheels 235 and the rear wheels 236 through the torque converter and the transmission, which causes the wheel loader 200 to travel. A steering cylinder 203 is provided between the vehicle front part 201 and the vehicle rear part 202. The steering cylinder 203 is actuated by operating the handle 208. As a result of the actuation, a direction of the vehicle front part 201 (a travelling direction of the vehicle body) changes with respect to the vehicle rear part 202.

Figure 14:
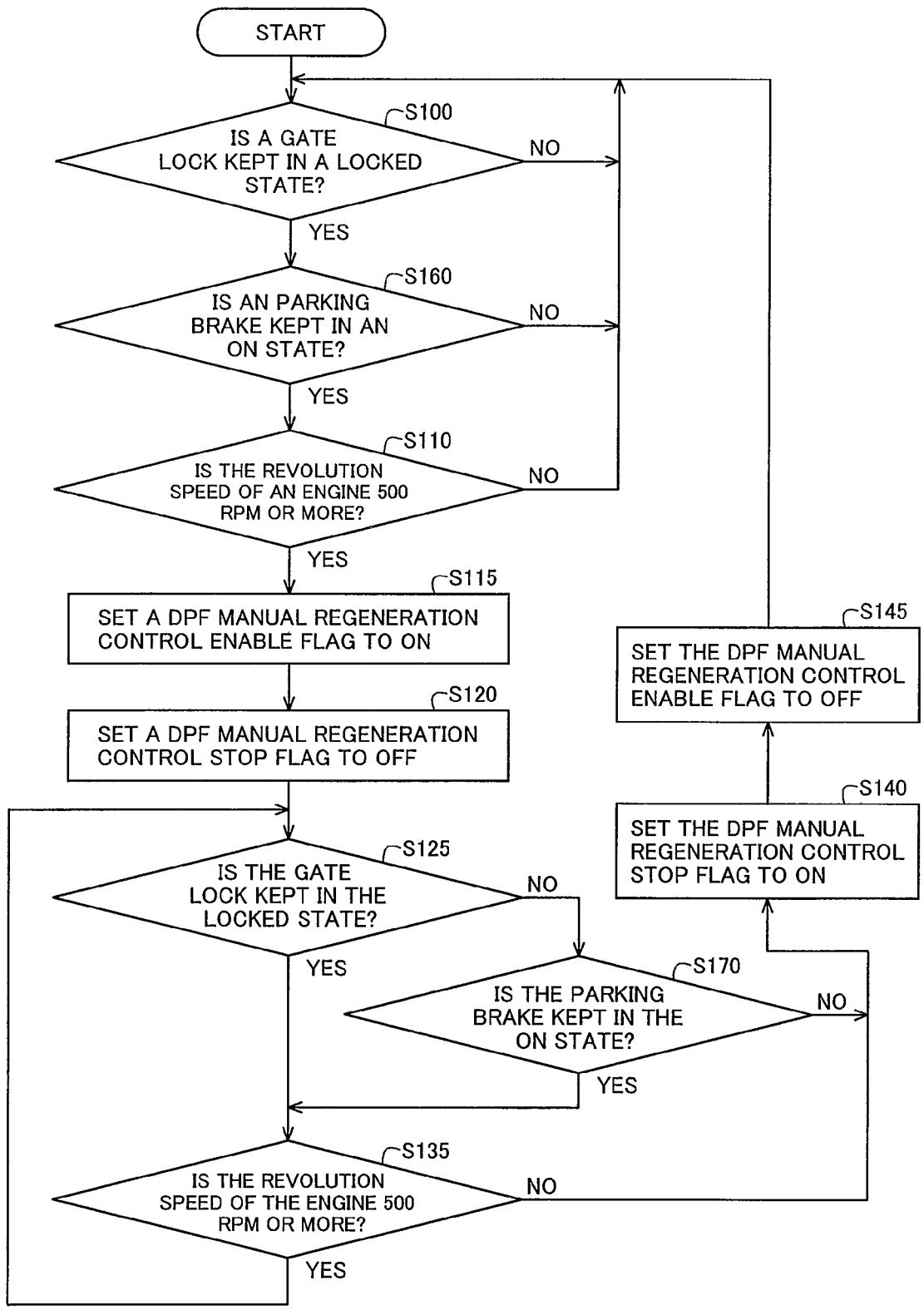
FIG. 14 is a flowchart illustrating how the vehicle-body control unit performs the computation for the manual regeneration control.

FIG. 14 is a flowchart illustrating a part of the computation performed for the manual regeneration control of the vehicle-body control unit 41B according to this embodiment, the part corresponding to the flowchart shown in FIG. 5. Points of difference between the flowcharts shown in FIGS. 5 and 14 are that in the flowchart shown in FIG. 14, the processing of step S105 shown in FIG. 5 is replaced with processing of step S160, and that processing of step S170 is added to the flowchart shown in FIG. 14.

To be more specific, according to this embodiment, after it is determined in step S100 that the gate lock lever 22 is kept at the second position B (kept in a locked state), a determination is made, on the basis of a detection signal from the position sensor 61, as to whether the parking brake operation device 60 is operated to kept at a braking position (kept in an ON state) (step S160). If it is determined that the parking brake operation device 60 is operated to kept at the braking position (kept in the ON state), the process proceeds to step S110, in which a judgment is made as to whether the revolution speed of the engine 1 is 500 rpm or more. If it is determined in step S160 that the parking brake operation device 60 is not operated to kept at the braking position (not kept in the ON state), the process returns to the start, and then the judgment processing in steps S100 and S160 are repeated.

In addition, after it is judged in step S125 that the gate lock lever 22 is not kept at the second position B (in a locked state) (in other words, the gate lock lever 22 is kept at the first position A), a judgment is made, on the basis of a detection signal from the position sensor 61, as to whether the parking brake operation device 60 is kept at the braking position (kept in the ON state) (step S170). If it is determined that the parking brake operation device 60 is kept at the braking position, the process proceeds to step S135, in which a determination is made as to whether the revolution speed of the engine 1 is kept at 500 rpm or more. If it is determined in step S170 that the parking brake operation device 60 is not kept at the braking position (in other words, if it is determined that the braking by the parking brake operation device 60 has been disabled), the DPF manual regeneration control stop flag is set to ON (step S140), and at the same time, the DPF manual regeneration control enable flag is set to OFF (step S145).

According to this embodiment configured as described above, when the manual regeneration control is started, advance preparations are made as follows: operating the parking brake operation device 60 such that the parking brake operation device 60 is moved to the braking position; and operating the gate lock lever 22 such that the gate lock lever 22 is moved up from the first position A to the second position B. At this point of time, the key switch 5 is kept in an ON state, and the engine 1 is being driven. In addition, because the accelerator pedal 2B is not pressed down, the target revolution speed of the engine 1 is kept at the low-speed idle revolution speed. In the flowchart shown in FIG. 13, when the parking brake operation device 60 is moved to the braking position, and when the gate lock lever 22 is moved up to the second position B, the vehicle-body control unit 41B sets the DPF manual regeneration control enable flag to ON, and sets the DPF manual regeneration control stop flag to OFF (steps S100->S160->S110->S115->S120). Next, the operator switches the manual regeneration starting switch 39 to an ON position so as to start the manual regeneration control. In the flowchart shown in FIG. 10, the vehicle-body control unit 41B determines that the DPF manual regeneration control enable flag is set to ON, and that the manual regeneration starting switch 39 is kept at an ON position; and consequently, the vehicle-body control unit 41B starts the DPF manual regeneration control (steps S200->S210->S220A). After the manual regeneration control is started, the revolution speed of the engine 1 is controlled such that the revolution speed in question is kept at the specified revolution speed Na suitable for the forced regeneration control as described above. As a result, the engine revolution speed increases. The sound of the engine 1 whose revolution speed has increased enables the operator to recognize that the manual regeneration control has started. Moreover, as described in the embodiment shown in FIG. 7, the electromagnetic switching valve 50 is switched from the open position to the closed position, and a hydraulic load is placed on the engine 1 to increase the load torque of the engine 1.

After a lapse of the specified length of time Tc since the start of the DPF manual regeneration control, the vehicle-body control unit 41B ends the manual regeneration control (steps S230->S250A). Here, even when the manual regeneration control is being executed, if the operator is required to restart the work, the operator moves down the gate lock lever 22 from the second position B to the first position A, and also disables the braking made by the parking brake operation device 60. In this case, in the flowchart shown in FIG. 13, the vehicle-body control unit 41B sets the DPF manual regeneration control stop flag to ON, and sets the DPF manual regeneration control enable flag to OFF (steps S125->S170->S140->S145). In addition, if the DPF manual regeneration control stop flag is switched from OFF to ON, the vehicle-body control unit 41B determines that the DPF manual regeneration control stop flag is set to ON, and consequently, the vehicle-body control unit 41B stops the DPF manual regeneration control, according to the flowchart shown in FIG. 10 (steps S240->S250A). When the manual regeneration control is stopped in the above-described manner, the target revolution speed of the engine 1 returns to the low-speed idle revolution speed. Therefore, the sound of the engine 1 whose revolution speed has decreased enables the operator to recognize that the manual regeneration control has ended.

According to this embodiment configured as described above, not only the effects (a) through (c) obtained in the first embodiment and the effects obtained in the second embodiment but also the following effects can be achieved.

To be more specific, according to this embodiment, the gate lock lever 22 is operated so as to disable the generation of the control pilot pressures a through f by the remote control valves 25, 26, and 27 (the first operation means). In addition to it, the parking brake operation device 60 is required to be moved to the braking position, before the manual regeneration control can be started. This eliminates the possibility that the manual regeneration control will be started with the hydraulic circuit unit shown in FIG. 9 constituting a part of the work system kept in an operatable state, and with the travelling system (not illustrated) kept in an operatable state. Accordingly, even if each of the remote control valves 25, 26, and 27 or the accelerator pedal 2B is operated during the manual regeneration control, the hydraulic circuit unit and the travelling system do not operate. The manual regeneration control, therefore, can be performed in a proper state in which the manual regeneration control and the operation of the work system (or the operation of the travelling system) do not influence each other.

The embodiments of the present invention have been described as above. However, the present invention is not limited thereto. The present invention can be changed in various ways without departing from the spirit and scope of the present invention.

1. As described above, in the above-described embodiment, the regeneration control is ended on the basis of the determination as to whether or not the regeneration control time has reached the specified length of time Tc. However, the regeneration control may also be ended on the basis of a determination as to whether the differential pressure across the filter 32 (a pressure loss of the filter 32) is lower than a specified value. To be more specific, the regeneration control is ended when the differential pressure across the filter 32 becomes lower than the specified value.

2. As described above, in the above-described embodiment, if the regeneration control time has reached the specified length of time Tc (or if the differential pressure across the filter 32 becomes lower than the specified value), the DPF manual regeneration control is ended. In this case, in order to end the DPF manual regeneration control, the target revolution speed is set back to the target revolution speed instructed by the engine control dial 2 (the low-speed idle revolution speed). However, the engine 1 may also be stopped to end the DPF manual regeneration control. Moreover, a proper selection switch may also be provided to allow an operator to make a selection whether to set the target revolution speed back to the target revolution speed instructed by the engine control dial 2 (the low-speed idle revolution speed) or stop the engine 1.

3. In the above-described embodiment, even when the manual regeneration control is being executed, if the gate lock lever 22 is operated such that the gate lock lever 22 is moved to the first position A (a position at which the flow control valves 17 through 19 can be operated by use of the remote control valves 25, 26, and 27), the manual regeneration control is ended so that the work can be immediately restarted. However, the manual regeneration control may also be ended when, instead of the operation of the gate lock lever 22, or in combination of the operation of the gate lock lever 22, the engine control dial is operated such that the target revolution speed of the engine 1 is changed from the low-speed idle revolution speed to the high-speed idle revolution speed. In general, as is the case with the disabling operation of the gate lock lever, the operation of the operator to change the target revolution speed of the engine 1 from the low-speed idle revolution speed to the high-speed idle revolution speed is one indication of operator's intention to start the work. Therefore, even if the manual regeneration control is ended on the basis of the operation of the engine control dial, similar effects can be obtained.

4. In the above-described embodiment, the regeneration fuel injection is performed by the fuel injector 39 used for regeneration which is provided in the exhaust pipe 31. However, regeneration fuel may also be injected into an exhaust gas by using an in-pipe (in-cylinder) injection system of the engine 1, which is based on the electronic governor 1a, so as to execute secondary injection (post injection) that injects fuel in an expansion stroke after main injection of multiple stage injection. For example, such a technique is disclosed in the patent document 1 (JP-A-2005-282545), JP-A-2006-37925, JP-A-2002-276340, and the like.

5. In the above-described embodiment, during the manual regeneration control, a load is placed on the hydraulic pump 11 driven by the engine 1 so that a load is placed on the engine 1, which causes the exhaust gas temperature to increase. However, instead of using the above method, or in combination with the above method, another method may also be adopted as follows: when the regeneration fuel is injected into the exhaust gas, narrowing a flow path of an exhaust pipe by a throttle valve provided in the exhaust pipe to perform loaded operation so that the exhaust gas temperature is increased to the temperature suitable for regeneration.

The invention claimed is:

1. An exhaust gas cleaning system for an engineering vehicle,
    said engineering vehicle including:
        a diesel engine;
        driven bodies used for work, the driven bodies being driven by the motive power of the engine;
        first operation means for instructing the operation of the driven bodies used for work; and
        second operation means that is selectively operated between a first position (A) at which the instruction by the first operation means is enabled and a second position (B) at which the instruction by the first operation means is disabled,
    said exhaust gas cleaning system including:
        a filtering unit disposed in an exhaust system of the engine, the filtering unit including a filter for collecting particulate matter included in an exhaust gas; and
        regeneration units for increasing the temperature of the exhaust gas to burn off and remove particulate matter deposited in the filter,
    wherein the exhaust gas cleaning system comprising:
        third operation means for instructing start of the operation of the regeneration units; and
        a regeneration control unit for starting the operation of the regeneration units, when the second operation means is switched to the second position (B), and when the third operation means is operated to instruct the start of the operation of the regeneration units.

2. The exhaust gas cleaning system for the engineering vehicle according to claim 1,
    wherein the regeneration control unit stops the operation of the regeneration units, after the operation of the regeneration units starts, when the second operation means is switched to the first position (A).

3. The exhaust gas cleaning system for the engineering vehicle according to claim 1,
    wherein the engineering vehicle further includes fourth operation means for instructing the target revolution speed of the engine; and
    the regeneration control unit starts the operation of the regeneration units, and controls the revolution speed of the engine to ensure that this revolution speed is kept at the specified revolution speed, when the second operation means is switched to the second position (B), and when the fourth operation means is operated to ensure that the low-speed idle revolution speed is instructed as the target revolution speed, and when the third operation means is operated to instruct the start of the operation of the regeneration units.

4. The exhaust gas cleaning system for the engineering vehicle according to claim 1,
    wherein the engineering vehicle further includes:
        fifth operation means for outputting an instruction signal used to control the revolution speed and torque of the engine to ensure that the travelling speed is controlled;
        travelling systems connected to an output shaft of the engine; and
        sixth operation means used for parking, the sixth operation means being operated to ensure that the travelling systems are braked when the engineering vehicle is parked; and
    the regeneration control unit starts the operation of the regeneration units, when the second operation means is switched to the second position (B), and when the sixth operation means is operated to ensure that the travelling systems are braked, and when the third operation means is operated to instruct the start of the operation of the regeneration units.

5. The exhaust gas cleaning system for the engineering vehicle according to claim 1,
    wherein the engineering vehicle further includes a hydraulic circuit unit including: a hydraulic pump driven by the engine; and hydraulic actuators which are driven by oil discharged from the hydraulic pump to ensure that the driven bodies used for work are driven;
    the filtering unit includes an oxidation catalyst that is disposed on the upstream side of the filter;
    each of the regeneration units includes fuel supply means for injecting regeneration fuel into the exhaust gas, and hydraulic pressure load generation means for placing a hydraulic load on the engine, the hydraulic pressure load generation means being disposed in the hydraulic circuit unit; and the regeneration control unit operates the fuel supply means and the hydraulic pressure load generation means, and controls the revolution speed of the engine to ensure that this revolution speed is kept at the specified revolution speed, when the second operation means is switched to the second position (B), and when the third operation means is operated to instruct the start of the operation of the regeneration units.

* * * * *